US012284078B2

(12) United States Patent
Anand et al.

(10) Patent No.: US 12,284,078 B2
(45) Date of Patent: Apr. 22, 2025

(54) METHODS AND SYSTEMS FOR CUSTOMIZING DEVICES IN AN IOT ENVIRONMENT USING SELF-ADAPTIVE MECHANISM

(71) Applicant: Samsung Electronics Co., Ltd., Suwon-si (KR)

(72) Inventors: Satyajit Anand, Karnataka (IN); Mayank Singh, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/194,112

(22) Filed: Mar. 31, 2023

(65) Prior Publication Data

US 2023/0239208 A1 Jul. 27, 2023

Related U.S. Application Data

(63) Continuation of application No. 17/545,401, filed on Dec. 8, 2021, now Pat. No. 11,621,890.

(30) Foreign Application Priority Data

Jan. 21, 2021 (IN) .............................. 202141002986

(51) Int. Cl.
*G16Y 20/20* (2020.01)
*G16Y 20/10* (2020.01)
(Continued)

(52) U.S. Cl.
CPC .......... *H04L 41/0816* (2013.01); *G16Y 20/10* (2020.01); *G16Y 20/20* (2020.01);
(Continued)

(58) Field of Classification Search
None
See application file for complete search history.

(56) References Cited

U.S. PATENT DOCUMENTS 8,004,391 B2 8/2011 Cruz Hernandez
8,948,821 B2 2/2015 Newham et al.
(Continued)

FOREIGN PATENT DOCUMENTS

KR 10-2019-0020499 A 3/2019
KR 10-2186414 B1 12/2020

OTHER PUBLICATIONS

Blume et al.; Effects of light on human circadian rhythms, sleep and mood; Somnologie; Somnology—Current Sleep Research and Concepts; Somnologie 2019—23:147-156; https://doi.org/10.1007/s11818-019-00215-x; Somnologie 3—2019; Aug. 20, 2019.
(Continued)

*Primary Examiner* — Chris Parry
*Assistant Examiner* — Abderrahmen Chouat
(74) *Attorney, Agent, or Firm* — Jefferson IP Law, LLP

(57) ABSTRACT

Methods and systems for customizing the characteristic of an electronic device (in the Internet of Things (IoT) environment based on at least one user's physiological state are provided. The method includes identifying context of the electronic device in response to receiving at least one event by the electronic device, wherein the at least one context includes at least one current user activity and an environmental context of a user. The method includes determining the change in a health parameter of the user and re-calibrates the characteristics of an electronic device through the magnitude of change in health parameter from the learning module. The method includes identifying current user activity and an environment context of the user on receiving the event from the electronic device).

18 Claims, 30 Drawing Sheets

(51) Int. Cl.
*G16Y 20/40* (2020.01)
*G16Y 40/30* (2020.01)
*H04L 41/0816* (2022.01)
*H04L 41/16* (2022.01)
*H04L 43/0817* (2022.01)
*H04L 67/12* (2022.01)

(52) U.S. Cl.
CPC .............. *G16Y 20/40* (2020.01); *G16Y 40/30* (2020.01); *H04L 41/16* (2013.01); *H04L 43/0817* (2013.01); *H04L 67/12* (2013.01)

(56) References Cited

U.S. PATENT DOCUMENTS

| | | | |
|---|---|---|---|
| 9,443,413 | B2 | 9/2016 | Faaborg et al. |
| 9,606,721 | B2 | 3/2017 | Park et al. |
| 10,304,325 | B2 | 5/2019 | You et al. |
| 10,674,476 | B1* | 6/2020 | Baker, Jr. ................ H04W 4/02 |
| 10,757,246 | B2 | 8/2020 | Avasthi et al. |
| 10,809,679 | B2 | 10/2020 | Kim |
| 2005/0060532 | A1 | 3/2005 | Dorenbosch et al. |
| 2013/0336284 | A1 | 12/2013 | Hiscock et al. |
| 2014/0235282 | A1* | 8/2014 | Kansal ................ H04L 51/043 455/466 |
| 2014/0309806 | A1* | 10/2014 | Ricci ..................... G06F 21/31 701/1 |
| 2015/0082371 | A1 | 3/2015 | DeWeese et al. |
| 2015/0269009 | A1* | 9/2015 | Faaborg ................ A61B 5/024 719/315 |
| 2015/0325098 | A1 | 11/2015 | Faaborg et al. |
| 2016/0063561 | A1* | 3/2016 | MacNeille ......... G06Q 30/0269 705/14.62 |
| 2016/0259491 | A1* | 9/2016 | Jacobs ................ G06F 3/0482 |
| 2016/0330311 | A1 | 11/2016 | Du et al. |
| 2017/0041769 | A1 | 2/2017 | Shim |
| 2018/0116607 | A1 | 5/2018 | Yu et al. |
| 2019/0175016 | A1 | 6/2019 | Coden et al. |
| 2020/0045164 | A1* | 2/2020 | Kwatra ............ H04M 1/72463 |
| 2020/0295985 | A1* | 9/2020 | Jain ........................ H04L 67/63 |
| 2021/0048929 | A1* | 2/2021 | Agnoli ................ G06F 3/0482 |
| 2021/0342040 | A1* | 11/2021 | Golan ................ G06F 3/0482 |
| 2022/0366131 | A1* | 11/2022 | Ekron ................ G06F 16/9538 |

OTHER PUBLICATIONS

Cajochen et al.; High Sensitivity of Human Melatonin, Alertness, Thermoregulation, and Heart Rate to Short Wavelength Light; The Journal of Clinical Endocrinology & Metabolism 90(3):1311-1316; The Endocrine Society; Dec. 7, 2004.

Indian Office Action dated Aug. 24, 2022, issued in Indian Application No. 202141002986.

International Search Report and Written Opinion dated Mar. 23, 2022, issued in International Patent Application No. PCT/KR2021/018424.

Extended European Search Report dated Jan. 22, 2024; European Appln. No. 21921469.9-1213 / 4196868 PCT/KR2021018424.

* cited by examiner

FIG. 5A

| | Events |
|---|---|
| Notification | SMS, SNS (whatsapp, fb, kakao, twitter, etc.), news streaming news (BBC, CNN, etc.), video streaming services (Netflix, Prime, etc.) and so on.. |
| Calls | BT calls, 4G/LTE calls, app calling, etc. |
| Events | Alarm, Calendar, Events, Memo, Reminder, watch apps, etc. |
| User Operation | Wrist wake up, Web browsing, Keyboard typing, etc. |

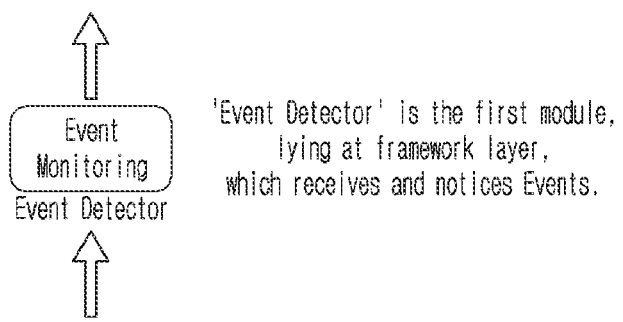

'Event Detector' is the first module, lying at framework layer, which receives and notices Events.

FIG. 7B

↑ Unpleasant → Major/considerable Physiological change (> threshold)
↑ Pleasant → Small/Soothing Physiological change (<= threshold)
[Threshold = 5]

| State | Value (Characteristic) | Physiological Change | User Persona |
|---|---|---|---|
| [ Event={"SNS Notification"}, UserActivity={"Sleeping"}, Environment={"11 PM", "Home", "Silent", "Dark"} ] | [Vibration="50", Display="Grey Scaling", Sound="0" ] | [HeartRate=" ↑ 20", Stress=" ↑ 20"] | [Age="15", Gender="M", Region="US", Prof="IT"] |
| [ Event={"SNS Notification"}, UserActivity={"Sleeping"}, Environment={"11 PM", "Home", "Silent", "Dark"} ] | [Vibration="45", Display="Grey Scaling", Sound="0" ] | [HeartRate=" ↑ 15", Stress=" ↑ 15"] | [Age="15", Gender="M", Region="US", Prof="IT"] |
| [ Event={"SNS Notification"}, UserActivity={"Sleeping"}, Environment={"11 PM", "Home", "Silent", "Dark"} ] | [Vibration="40", Display="Grey Scaling", Sound="0" ] | [HeartRate=" ↑ 10", Stress=" ↑ 10"] | [Age="15", Gender="M", Region="US", Prof="IT"] |
| [ Event={"SNS Notification"}, UserActivity={"Sleeping"}, Environment={"11 PM", "Home", "Silent", "Dark"} ] | [Vibration="35", Display="Grey Scaling", Sound="0" ] | [HeartRate=" ↑ 5", Stress=" ↑ 4"] | [Age="15", Gender="M", Region="US", Prof="IT"] |
| [ Event={"SNS Notification"}, UserActivity={"Sleeping"}, Environment={"11 PM", "Home", "Silent", "Dark"} ] | [Vibration="40", Display="Grey Scaling", Sound="0" ] | [HeartRate=" ↑ 15", Stress=" ↑ 15"] | [Age="25", Gender="F", Region="GER", Prof="IT"] |
| [ Event={"SNS Notification"}, UserActivity={"Sleeping"}, Environment={"11 PM", "Home", "Silent", "Dark"} ] | [Vibration="35", Display="Grey Scaling", Sound="0" ] | [HeartRate=" ↑ 10", Stress=" ↑ 10"] | [Age="15", Gender="M", Region="Kor", Prof="Factory"] |

FIG. 8A

If (C > threshold) → "Unpleasant physiological change" (↑)
→ 'Health change Feedback' module send (S,V,C) to 'Physical Reactor' module.
→ 'Physical Reactor' module fetch User Persona (P) and send (S,V,C,P) to Policy
  module (Physiological Model Set)

| State (S) | Value (V) | Physiological Change (C) | User Persona (P) |
|---|---|---|---|
| [ Event={"SNS Notification"}, UserActivity={"Sleeping"}, Environment={"11 PM", "Home", "Silent", "Dark"} ] | [Vibration="50", Display="Grey Scaling", Sound="0" ] | [HeartRate=" ↑ 20", Stress=" ↑ 20"] | [Age="15", Gender="M", Region="US", Prof="IT"] |

The policy module identifies indicative new characteristic value (Vnew) based
on S, V, P & magnitude of C.
π(S,V,P,C) → Vnew    π is policy function inside policy module

| State (S) | Value (V) |
|---|---|
| [ Event={"SNS Notification"}, UserActivity={"Sleeping"}, Environment={"11 PM", "Home", "Silent", "Dark"} ] | [Vibration="50", Display="Grey Scaling", Sound="0" ] |

(S,Vnew) pair → "Characteristic Modifier" → Apply to Learning module dataset

During REM stage of sleep, voluntary muscles are paralysed and hard alarm can be a risk to user from mild stress to heart attack.

User feel Stressed when face difficulty in typing specific key. E.g., its tough for fat finger guy to type keys at the extreme edge.

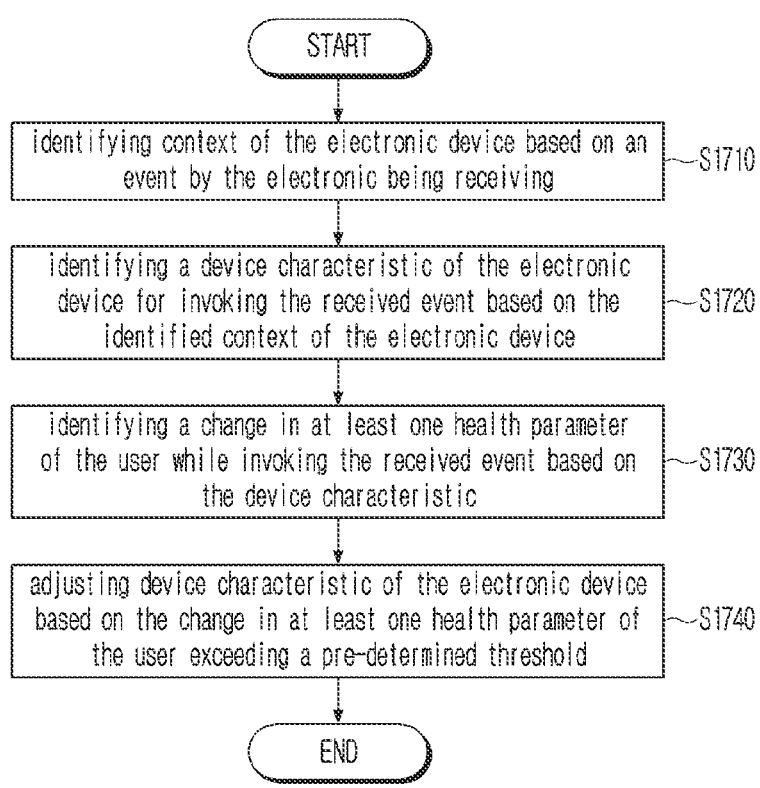

METHODS AND SYSTEMS FOR CUSTOMIZING DEVICES IN AN IOT ENVIRONMENT USING SELF-ADAPTIVE MECHANISM

CROSS-REFERENCE TO RELATED APPLICATION(S)

This application is a continuation application of prior application Ser. No. 17/545,401, filed on Dec. 8, 2021, which has issued as U.S. Pat. No. 11,621,890 on Apr. 4, 2023, and is based on and claims priority under 35 U.S.C. § 119(a) of an Indian patent application number 202141002986, filed on Jan. 21, 2021, in the Indian Patent and Trademark Office, the disclosure of which is incorporated by reference herein in its entirety.

BACKGROUND

1. Field

The disclosure relates to the field of an Internet of Things (IoT) environment. More particularly, the disclosure relates to customizing an electronic device in the IoT environment based on a user's physiological state.

2. Description of Related Art

In general, an electronic device receives multiple notifications to indicate a user about current event(s). The received notifications may be provided to the user (e.g., by default configurations of the electronic device in the IoT environment). The default configurations of the electronic device may have pre-defined set of values comprising intensity value of the vibration, display value, sound value and the like. The default configurations of the electronic device may induce a spontaneous change in the user's physiological state such as heart rate, blood pressure, stress level, and the like.

The magnitude of the user's physiological state varies depending on the user's personal traits such as experience, health state, psychological mind set of the user, and the like. Thereby, the electronic device may provide the instant change and creates an unpleasant experience among different users in receiving various notifications. The unpleasant experience can range from mild stress to severe effects like heart attack, rise in blood pressure, and the like. Also, the prolonged ignorance to sudden change in physiological state can lead to many long-term problems.

The conventional methods may not deliver the solution which can provide a pleasant physiological change to all events for all the users on receiving the notification.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for customizing the characteristic of an electronic device in the IoT environment based on a user's physiological state.

Another aspect of the disclosure is to provide methods and systems for determining a change in at least one health parameter of the user and re-calibrating at least one characteristic of at least one electronic device based on magnitude of the change in the at least one health parameter.

Another aspect of the disclosure is to provide methods and systems for identifying at least one current user activity and at least one environment context of the user on receiving the event from the electronic device.

Additional aspects will be set forth in part in the description which follows and, in part, will be apparent from the description, or may be learned by practice of the presented embodiments.

In accordance with an aspect of the disclosure, methods and systems for customizing at least one characteristic of an electronic device are provided. The method includes identifying at context of the electronic device in response to receiving at least one event by the electronic device, wherein the at least one context includes at least one current user activity and an environmental context of a user. The method includes determining at least one characteristic of the electronic device from a learning module based on the received at least one event and the at least one context of the electronic device. The method further includes analyzing at least one variation in the at least one context of the electronic device, at least one change in a health parameter of the user based on the at least one event received on the electronic device. Further, the method further includes adjusting at least one characteristic of the electronic device based on the at least one detected change in the health parameter of the user exceeds a pre-determined threshold.

In accordance with another aspect of the disclosure, a system for customizing characteristic of an electronic device is provided. The system includes a cloud server and a hardware processor to identify at least one context of the electronic device in response to receiving at least one event by the electronic device, wherein the at least one context includes at least one current user activity and an environmental context of a user. Further, the system determines at least one characteristic of the electronic device from a learning module based on the received at least one event and the at least one context of the electronic device. Also, the system analyzes at least one variation in the at least one context of the electronic device, at least one change in a health parameter of the user based on the at least one event received on the electronic device. Further, the system adjusts at least one characteristic of the electronic device based on the at least one detected change in the health parameter of the user exceeds a pre-determined threshold.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5A is an example diagram depicting identification of events and determining current user activity and environmental context to analyze a variation in a user's physiological states, according to an embodiment of the disclosure;

FIG. 7B is an example diagram depicting a pre-trained universal method comprising labelled dataset and a policy of a learning module receiving crowdsourced data based on identified pattern change in a physiological state of a user based on characteristic change of an electronic device, according to an embodiment of the disclosure;

FIG. 8A is an example diagram depicting a calculation of a threshold value to adjust a characteristic of an electronic device, according to an embodiment of the disclosure;

FIG. 17 is a flow diagram illustrating a method for customizing an electronic device as disclosed herein according to an embodiment of the disclosure.

Throughout the drawings, like reference numerals will be understood to refer to like parts, components, and structures.

DETAILED DESCRIPTION

Figure 1:
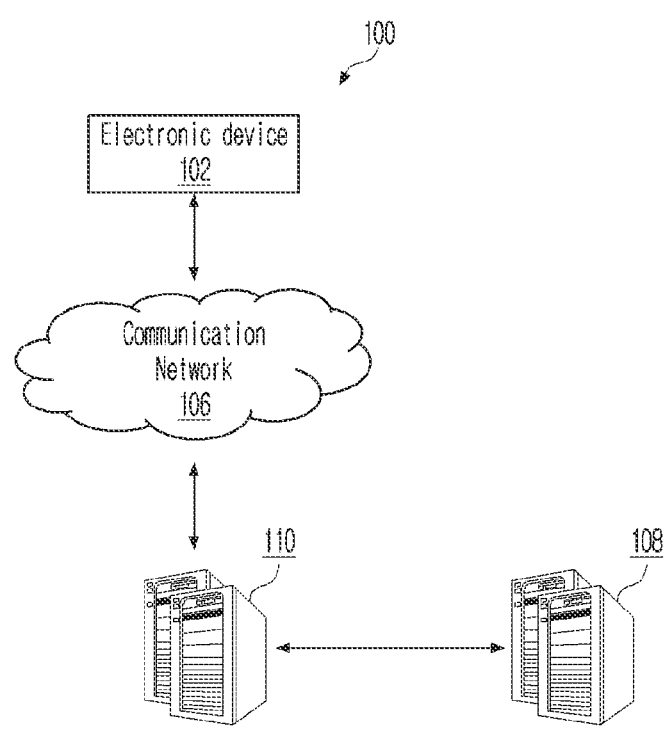
FIG. 1 illustrates an environment for customizing at least one characteristic of an electronic device in an IoT environment based on a user's physiological state, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein disclose methods and systems for customizing at least one characteristic of an electronic device in an IoT environment based on a user's physiological state.

Referring to the drawings, and more particularly to FIGS. 1 to 3, 4A to 4C, 5A to 5E, 6, 7A, 7B, 8A, 8B, 9A, 9B, 10A, and 10B, where similar reference characters denote corresponding features consistently throughout the figures, there are shown example embodiments.

FIG. 1 illustrates an environment for customizing at least one characteristic of an electronic device in an IoT environment based on a user's physiological state, according to an embodiment of the disclosure.

Referring to FIG. 1, an environment 100 includes an electronic device 102, connected to an IoT based server 110 through a communication network 106. The electronic device 102 may be connected to the communication network 106 connected to an IoT based server 110. The electronic device 102 may be connected to the IoT based server 110 through the communication network 106 and/or at least one other communication network (not shown).

The electronic device 102 referred herein may be a device that enables user(s) to receive at least one notification related to an IoT environment. In an embodiment, the electronic device 102 may be a user device that is being used by the user to connect, and/or interact, and/or control a plurality of other devices. In another embodiment, the electronic device 102 may be a server that may be deployed in a specific IoT environment. The server may be configured as a hardware device independent of the IoT based server 110 but is not limited thereto. The server may be a standalone server or may be a server designed to be classified into software. Examples of the electronic device 102 may be, but not limited to, a wearable device, a smart wear, a wearable technology, a wearable, a smart phone, a mobile phone, a video phone, a computer, a tablet personal computer (PC), a netbook computer, a laptop, a personal digital assistant (PDA), a workstation, a server, and so on.

The electronic device 102 and the IoT based server 110 may be connected to each other. In an example, the IoT based server 110 and the electronic device 102 may be connected to each other using the communication network 106. The communication network 106 may include at least one of, but is not limited to, a wired network, a value-added network, a wireless network, a satellite network or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (Wi-Fi), Bluetooth, Bluetooth low energy, Zigbee, Wi-Fi Direct (WFD), Ultra-wideband (UWB), infrared data association (IrDA), near field communication (NFC). In another example, the electronic device 102, may be connected directly (for example: via a direct communication, via an access point, and so on). In another example, the electronic device 102 may be connected to the IoT based server 110. In another example, the electronic device 102 may be connected to the IoT based server using the communication network 106. In another example, the electronic device 102, may be connected to other electronic device via a relay, a hub, and a gateway. It is understood that the electronic device 102 and the IoT based server 110 may be connected to each other in any of various manners (including those described above), and may be connected to each other in two or more of various manners (including those described above) at the same time.

The IoT based server 110 referred herein may be a server that receives, stores, and manages device information mappings, functional capabilities, manufacturer provided information, and location information of the electronic device 102 present in a network environment. In an embodiment herein, the network environment may be an IoT environment including for example, but is not limited to, a smart home environment, a smart office environment, a smart hospital environment, and so on. The device information may include information such as, but is not limited to, an identification value (for example: device identifier (ID) information/unique identifier) of the electronic device 102, a device type, and so on. In an example herein, the identification value/device ID information may be, but is not limited to, a Media Access Control (MAC) identifier (MAC ID), a serial number, a unique device ID, and so on. The location information includes information about a location of the electronic device 102. The manufacturer provided information of the electronic device 102 may include at least one of, but is not limited to, a model of the electronic device 102, a year of manufacturing of electronic device 102, a lifespan of the electronic device 102, operating system being used by the electronic device 102, version of the operating system being used by the electronic device 102, and so on. The IoT based server 110 may update the device information, the functional capabilities, and location information of the electronic device 102, in the IoT environment.

The IoT based server 110 receives events being performed in the background by the electronic device 102. The events may be received from the other user(s) (e.g., by voice calls/video calls, message notification, mail notification and the like). The events may also be received from the electronic device (e.g., by reminders such as alarm notification, screen wake up calls and the like). The pre-invoker sensor monitors the electronic device 102 before the occurrence of the notification. The pre-invoker sensors may monitor the physiological state of the user before the occurrence of the notification. The pre-invoker sensors may include but not limited to photodiode sensor such as Photoplethysmography (PPG), Heart Rate Variability sensor and the like. The sensors of the electronic device may monitor the events received by the electronic device 102. The events received by the electronic device 102 may be but is not limited to receiving voice calls/video calls, mail notifications, reminders, alarm notifications, screen wake up, message notifications, and the like.

The IoT based server 110 may keep track of current user activity and environmental context of a user. The current user activity and environmental context of the user is monitored by the pre-invoker sensors of the electronic device. The pre-invoker sensors identify the current user activity and the environmental context of the user on receiving the event by the electronic device. The pre-invoker sensor monitors for a pre-defined time slot and the pre-defined time is configured based on the current user activity and the environmental context. For instance, the notification of the user while sleeping can have higher pre-defined time slot. The current user activity may be the activity performed by the user on receiving the event. The current user activity may include, but is not limited to, jogging, walking, running, attending office meeting, in a workout session, sleeping, sitting, resting, cooking, hiking, swimming, driving, trekking, TV watching, cycling, standing, lying awake, climbing stairs and the like. The environmental context of the user may include the current environment of the user while receiving the event. The environment context may include, but not limited to time, place, ambient sound level such as noisy, silent, part of the day such as night, morning, weekday, weekend, ambient light, external context, current location such as home, office, gym, shopping area, of the user and the like.

The IoT based server 110 may also receive and store one or more characteristic of the electronic device. The characteristic of the electronic device may be provided by a learning module 212 based on the received events, the current user activity and the environmental context of the user. The learning module 212 provides the calibrated characteristic value of the electronic device. The calibrated characteristic of the electronic device may include but not limited to, vibration, display settings, sound, scaling to be displayed on the screen and the like to be notified to the user on receiving the events. The characteristic of the electronic device depends on the current user activity and the environmental context of the user. For example: the user sleeping in a silent ambient surrounded by the dark light receives a notification with the characteristic of the electronic device having zero sound, with reduced display settings with the less contrast and with very less vibration. The IoT based server receives the re-calibrated/adjusted characteristic of the electronic device from a learning module 212. The re-calibrated/adjusted characteristic of the electronic device is provided by the learning module 212. The IoT based server 110 may be configured as a hardware device independent of the electronic device 102 but is not limited thereto. The IoT based server 110 may be a component of the electronic device 102 or may be a separate server designed to be classified into software.

The IoT based server 110 may also receive and store information related to the user's personal data. The user's personal information may include age, gender, region, country, profession, and the like. The IoT based server 110 can also track the physiological state of the user including the heart rate, stress level, blood pressure and the like. The sensors of the electronic device monitor the change in the physiological state of the user. The sensors may include but not limited to photodiode sensor such as Photoplethysmography (PPG), Heart Rate Variability sensor and the like. The IoT based server 110 can identify the change in physiological state of the user on receiving the event and makes the comparison of the state change with the threshold value provided by the learning module 212. The IoT based server 110, on identifying that the change in the physiological state of the user has exceeded a pre-defined threshold value, the learning module automatically re-calibrates the characteristic value of the electronic device 102. The threshold value can be generated by the learning module 212 based on current user activity and the environment context of the user. The threshold value may be the empirical value generated by the learning module 212 on receiving the current user activity and the environmental context of the user. The threshold value may be the experiential, or the value obtained based on the mathematical approach on the current user activity and the environmental context of the user.

In an embodiment herein, the electronic device 102 can be integrated with another device such as, but not limited to, a mobile phone, a smartphone, a tablet, a phablet, a personal digital assistant (PDA), a computer, a laptop, a phone, an IoT device, a wearable device, a smart watch, a vehicle infotainment system, a Television (TV), a camera and so on. The electronic device 102 may also have access to databases (not shown) for fetching information related to at least one query received from the user. In addition, the electronic device 102 may further connect to at least one of a cloud, a dedicated user interaction device cloud, another server and so on using at least one communication network for accessing information related to at least one query received from the user. Examples of the communication network can be, but not limited to, the internet, a wired network (a Local Area Network (LAN), Ethernet and so on), a wireless network (a Wi-Fi network, a cellular network, a Wi-Fi Hotspot, Bluetooth, Zigbee and so on) and so on.

In an embodiment, the environment 100 may include the electronic device 102, the communication network 106, and the IoT based server 110 as illustrated in FIG. 1.

Referring to FIG. 1 the electronic device 102 connected to the IoT based server 110 through one or more communication network 106. Example of the electronic device 102 may be a smart watch, a wearable device, a wearable technology, wearables, smart wear, wearable technology, a smart phone, a mobile device and the like, that can be worn close to and/or surface of the skin which can detect, analyze and transmit information concerning body signals such as vital signs, ambient data, tracks activity of the user and the like.

Referring to FIG. 1, the IoT based server 110 may connect the electronic device 102 in the environment 100 through the communication network 106. The IoT based server 110 may in turn connected to the server 108 for performing the entire operation requested by the user.

Figure 2:
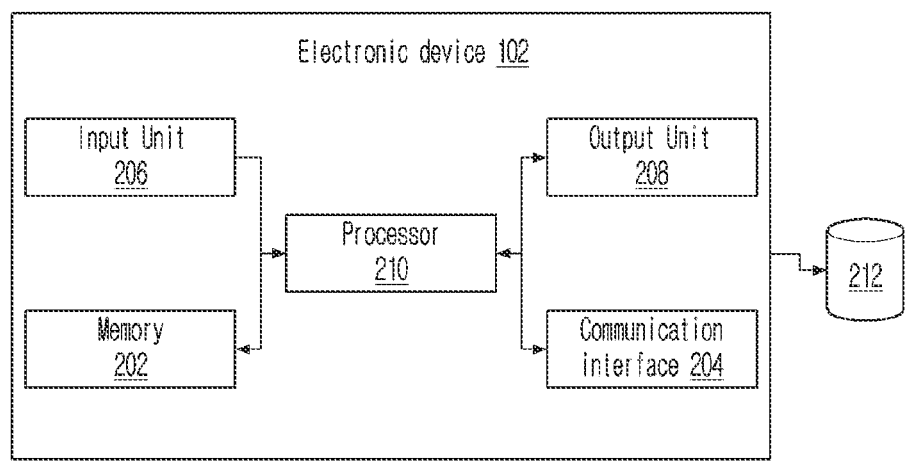
FIG. 2 depicts a block diagram illustrating various units of an electronic device, which is used to access the IoT environment, according to an embodiment of the disclosure.

FIG. 2 depicts a block diagram illustrating various units of an electronic device which is used to access an IoT environment, according to an embodiment of the disclosure.

Referring to FIG. 2, an electronic device 102 may include suitable hardware and software to directly communicate in an IoT environment through a communication network.

The electronic device 102 may include a memory 202, a communication interface 204, an output unit 208, a processor 210, an input unit 206 and the memory 202 connected to the learning module 212 and the like. Examples of the electronic device 102 can be, but not limited to, a wearable device, a smart wear, a wearable technology, a wearables, a smart phone, a mobile phone, a video phone, a computer, a tablet personal computer (PC), a netbook computer, a laptop, a personal digital assistant (PDA), a workstation, a server, and so on.

In an embodiment the electronic device 102 may be, but not limited to the IoT device, which may be connected to at least one other IoT device in an IoT environment. The electronic device 102 may be connected to the plurality of IoT devices through the IoT based server 110. Examples of the IoT devices may be, but not limited to a television (TV), an air conditioner (AC), a house hold appliance (an oven, a refrigerator, a washing machine, a fan, a cooler, a light system, a sound device and the like), a vehicle display, a kitchen accessory, a sensor (a door sensor, a motion sensor, a thermometer, a microphone, a proximity sensor, a contact sensor or the like) home or any physical space controlled by IoT device and the like are placed at different locations (a living room, a kitchen, a room and so on).

The memory 202 may store at least one of, but is not limited to, the user's personal data information of the user such as age, country, gender and the physiological state of the user including the heart rate, stress level, blood pressure and the like. In an embodiment herein, the physiological state of the user may also be considered as the health parameter of the user. The memory 202 may also store the change in the physiological state of the user on receiving the events on the electronic device. The memory 202 further stores threshold value required to make comparison of the physiological state change of the user. The memory 202 referred herein may include at least one type of storage medium, from among a flash memory type storage medium, a hard disk type storage medium, a multi-media card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The communication interface 204 may include one or more components using which the electronic device 102 communicates with another device (for example: another electronic device, the IoT based server 110, and so on) using data communication methods that are supported by the communication network 106. The communication interface 204 may include components such as, a wired communicator, a short-range communicator, a mobile/wireless communicator, and a broadcasting receiver. The wired communicator may enable the electronic device 102 to communicate with the other devices (for example: another electronic device, the IoT based server 110, the plurality of IoT devices, and so on) using the communication methods such as, but not limited to, wired LAN, the Ethernet, and so on. The short-range communicator may enable the electronic device 102 to communicate with the other devices using the communication methods such as, but is not limited to, Bluetooth low energy (BLE), near field communicator (NFC), wireless local area network (WLAN) (or Wi-fi), Zigbee, infrared data association (IrDA), Wi-Fi direct (WFD), Ultrawide band communication, Ant+ (interoperable wireless transfer capability) communication, shared wireless access protocol (SWAP), wireless broadband internet (Wibro), wireless gigabit alliance (WiGiG), and so on.

The input unit 206 may be configured to receive incoming events in the foreground/background by the electronic device 102. The events may be received from the other user(s) (e.g., by voice calls/video calls, message notification, mail notification and the like). The events may also be received from the electronic device (e.g., by reminders such as alarm notification, screen wake up calls and the like). The sensors of the electronic device may monitor the events received by the electronic device 102. Examples of the events may be, but not limited to receiving voice calls/video calls, mail notifications, meeting reminders, alarm notifications, screen wake up, message notifications, and the like. The events which are invoked to the electronic device are notified by the user with a characteristic of the electronic device. The characteristic of the electronic device 102 have the defined set of values used to notify the user. The characteristic of the electronic device may include, but not limited to intensity value of the vibration, display value of the screen, sound level value, contrast screen level and the like.

The input unit 206 may be configured to receive and store the current user activity. The current user activity of the user is monitored by the pre-invoker sensors of the electronic device. The pre-invoker sensors identify the current user activity of the user on receiving the event by the electronic device. The input unit 206 receive current user activity from the sensors of the electronic device 102. The current user activity may be the activity performed by the user on receiving the event. The current user activity may include, but not limited to various activities performed by the user such as jogging, walking, running, attending meetings, a workout session, sleeping, sitting, resting, cooking, hiking, swimming, driving, trekking, watching television (TV), cycling, standing, lying awake, climbing stairs and the like.

The input unit 206 may be configured to receive and store the environment context of the user, which includes the current environment of the user. The environmental context of the user is monitored by the pre-invoker sensors of the electronic device. The pre-invoker sensors identify the environmental context of the user on receiving the event by the electronic device 102. The input unit 206 receive the environmental context from the sensors of the electronic device 102. The environment context of the user may include but not limited to time, place, ambient sound level such as noisy, silent, part of the day such as night, morning, weekday, weekend, ambient light, external context, current location such as home, office, gym, shopping area, of the user and the like.

The output unit 208 may be configured to provide an output to the user. The output may indicate at least one of the characteristics of the electronic device based on the received event, user activity and the environment context of the user. The learning module 212 provides the re-calibrated value of the characteristic of the electronic device to notify the user. The adjusted characteristic value of the electronic device depends on the received event, user activity and the environment context of the user.

In an example, if the electronic device 102 is the server, the output unit 208 may receive the output from the processor 210 and communicates the output to the electronic device 102 through the communication interface 204, to be displayed to the user.

In an example, if the electronic device 102 is the user device, the output unit 208 may receive the output from the processor 210 and include for example, but is not limited to, a sound output unit, a display, a vibration motor, a User Interface (UI) module, and so on, to provide the received output to the user. The output may be provided as, but is not limited to, an audio signal, a video signal, a vibration signal, text, and so on. The sound output unit may be a speaker that receives the output from the processor 210 and provides the output as the audio signal to the user. The display receives the output from the processor 210 and displays the output as at least one of, an image, a video signal, text, or the like to the user. The UI module may provide a specialized UI or graphics user interface (GUI), or the like, to provide the output to the user.

The processor 210 may comprise of one or more processors. The one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor 210 may be configured to generate a calibrated characteristic value of the electronic device. The calibrated characteristic of the electronic device is provided by the learning module 212 based on received events, the current user activity and the environmental context of the user. The calibrated characteristic for the event is determined by identifying the current user activity and the environmental context of the user from the learning module 212. The learning module 212 can be a reinforcement learning module. The processor 210 keeps track of the physiological state change of the user on receiving the event with the calibrated characteristic value of the electronic device. The calibrated characteristic value of the electronic device 102 may be intensity value of the vibration, value of display characteristic, sound output value and the like. The magnitude of the change in the physiological state of the electronic device 102 can vary from person to person. The magnitude of the change in the physiological state of the electronic device 102 can also depend on the various health parameters such as personal traits, past experiences of the user, psychological mind set, health state, adaption and the like. The change in the physiological state may be a change in heart rate, a change in the blood pressure, a change in the stress level and the like on receiving the event.

The processor 210 may analyze the change in the physiological state of the user based on the event received by the electronic device. The processor 210 determines whether the variation in the physiological state (health parameter of the user) exceeding the threshold value (which has been generated by the learning module 212). The learning module 212 can generate the threshold value based on unpleasant or intolerable experience of the user on receiving the event with the defined characteristic on the electronic device. The threshold value depends on the user personal details such as age, gender, profession, physiological parameters, and the like. For example, the user of an older age may have a less tolerable level and should have a lesser threshold and a male user has a higher tolerance level and can have a higher threshold.

The processor 210, on determining that the physiological state/health parameters of the user exceeds the threshold level, may re-calibrate the characteristic value of the electronic device. The re-calibration/adjustment of the characteristic of the electronic device 102 can be performed by the learning module 212 based on the received events, user activity and the environmental context of the user. The learning module 212 learns from the unpleasant or bad experience of the user on receiving the events with the defined characteristic value of the electronic device.

In an embodiment, one or a plurality of processors can control the processing of the input data in accordance with a predefined operating rule or an Artificial Intelligence (AI) model stored in the non-volatile memory and the volatile memory. The predefined operating rule or artificial intelligence model can be provided through training or learning.

The learning module 212 as illustrated in FIG. 1, provides a learning of the user's behavior on the various environments and to make sequence of decisions to meet user's requirements. The learning module 212 involves, applying a plurality of learnt data over a predefined operating rule to obtain the user's requirements. The learning module 212 may be provided on the electronic device 102 itself in which AI is performed according to an embodiment, and/or may be implemented through a separate server/system. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning module 212 can be used for training a predetermined target device (for example, a robot, an IoT device, a wearable device, a user equipment, a vehicle infotainment system, or any other computing device) using a plurality of learning data to cause, allow, or control the target device to make a determination or prediction. Examples of learning modules include, but are not limited to, supervised learning, unsupervised learning, semi-supervised learning, or reinforcement learning, pre-trained universal learning and the like.

In an embodiment, the electronic device 102, as illustrated in FIG. 2, can be used to interact with the plurality of Internet of Things (IoT) devices. The electronic device 102 may be connected to the devices through the communication network 106. The electronic device 102 may communicate to the plurality of Internet of Things (IoT) devices through the communication interface 204 and the available plurality of devices.

The user may perform various actions to interact with the plurality of Internet of Things (IoT) devices. For example, the user may instruct the device to perform various specific actions to be performed by the Internet of Things (IoT) device. For instance, the user may provide a command (such as a voice command, hand gesture, and so on) to the electronic device to communicate to the IoT device. For example, the user may provide a voice command to switch on the smart light, the user may provide the voice command to adjust the settings of the smart devices such as television, air conditioner, light, cooking accessories, windows, home appliances, doors and the like. The user may provide a hand/finger gesture to control various smart devices, gesture control allows the users to interact with the electronic device without touch or audio. The electronic device 102 can detect and decipher movements and/or actions and translate the movements and/or actions into functions. The electronic device 102 can control IoT devices through the sensors. The various image sensing units can use gesture recognition to capture the movements in detail, allowing the device to process them.

Figure 3:
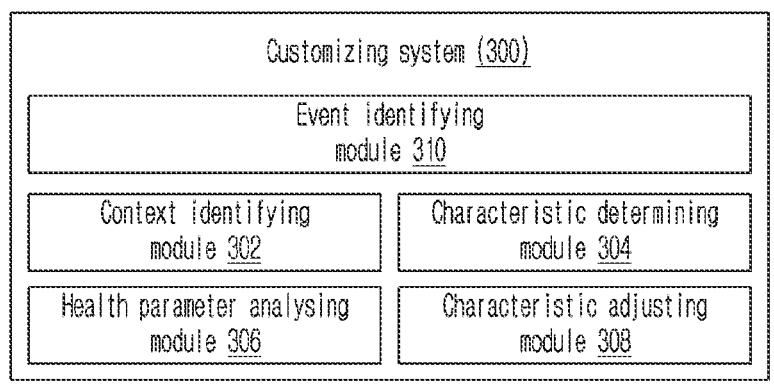
FIG. 3 depicts a block diagram illustrating various units of a customizing system to customize an electronic device in an IoT environment based on a user's physiological state, according to an embodiment of the disclosure.

FIG. 3 depicts a block diagram illustrating various units of a customizing system to customize an electronic device in an IoT environment based on user's physiological state, according to an embodiment of the disclosure.

The customizing system 300 may include an event identifying module 310, a context identifying module 302, a characteristic determining module 304, a health parameter analyzing module 306 and a characteristic adjusting module 308. The customizing system 300 can be located in the electronic device 102, but not limited to a server, communication network, any computing device, and so on.

Referring to FIG. 3, a customizing system 300 can be integrated with a device such as, but not limited to a mobile phone, a smartphone, a tablet, a phablet, a personal digital assistant (PDA), a computer, a laptop, a phone, an IoT device, a wearable device, a vehicle infotainment system, a TV, a camera, an IoT server, an internet server, a communication network and so on. The customizing system 300 may also have access to databases (not shown) for fetching information for queries received from the user. In addition, the customizing system 300 may further connect to at least one of a cloud, a dedicated user interaction device cloud, a server and so on using at least one communication network for accessing information for the queries received from the user. Examples of the communication network can be, but not limited to, the internet, a wired network (a Local Area Network (LAN), Ethernet and so on), a wireless network (a Wi-Fi network, a cellular network, a Wi-Fi Hotspot, Bluetooth, Zigbee and so on) and so on.

Referring to FIG. 3, the event identifying module 310 is configured to identify and store current incoming events occurring on the background by the electronic device 102. The incoming events may be, but not limited to receiving voice calls/video calls, mail notifications, meeting reminders, alarm notifications, screen wake up, message notifications, and the like.

Referring to FIG. 3, the context identifying module 302 is configured to receive and store current user activity and the environmental context of the user. The current user activity may be the activity performed by the user on receiving the event. The current user activity may include, but not limited to various activities performed by the user such as jogging, walking, running, attending meetings, in a workout session, sleeping, sitting, resting, cooking, hiking, swimming, driving, trekking, TV watching, cycling, standing, lying awake, climbing stairs and the like.

The context identifying module 302 may include the environment context of the user may include but not limited to time, place, ambient sound level such as noisy, silent, part of the day such as night, morning, weekday, weekend, ambient light, external context, current location such as home, office, gym, shopping area, of the user and the like. The environment context of the user may be the place, time, ambient of the user at the time of receiving the event.

Referring to FIG. 3 the characteristic determining module 304 is configured to have the defined set of values used to invoke the user. The characteristic of the electronic device 102 may include, but not limited to intensity value of the vibration, display value of the screen, sound level value, contrast screen level and the like.

Figure 4A:
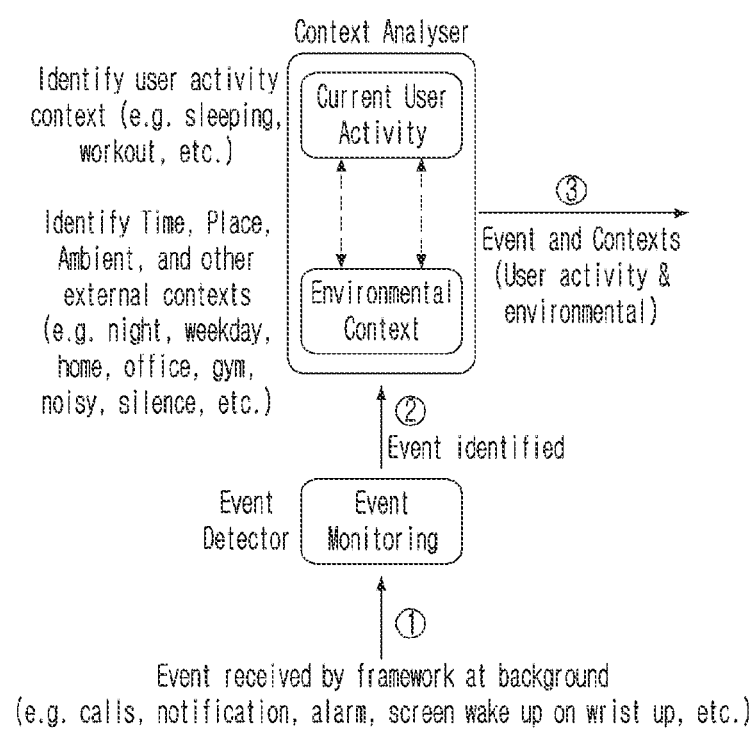
FIG. 4A is an example diagram depicting identification of at least one context of an electronic device based on at least one received event and adjustment of at least one characteristic of the electronic device based on a variation on a user's physiological state, according to an embodiment of the disclosure.
Figure 4B:
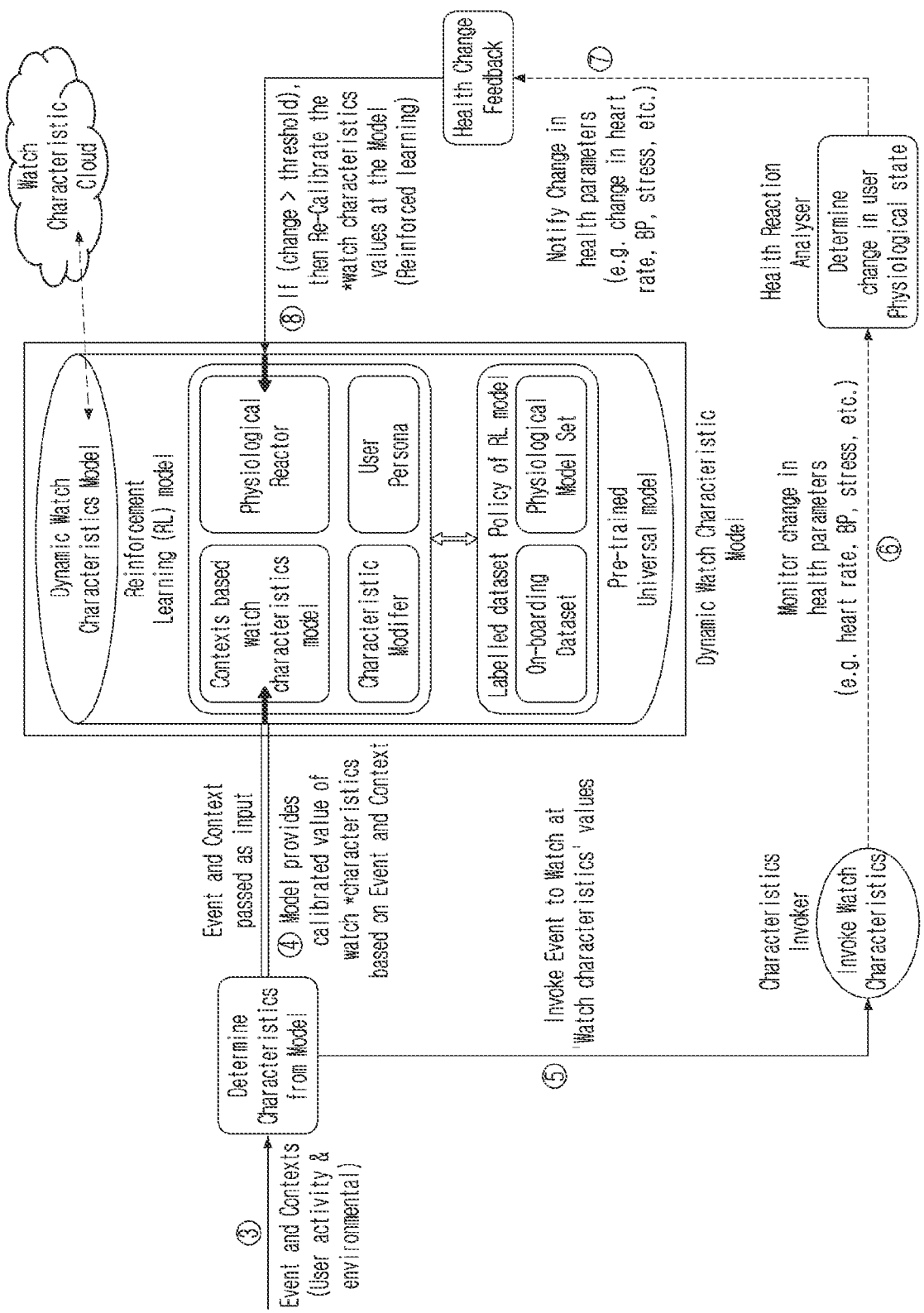
FIG. 4B is an example diagram depicting identification of at least one context of an electronic device based on at least one received event and adjustment of at least one characteristic of the electronic device based on a variation on a user's physiological state, according to an embodiment of the disclosure.

Referring to FIGS. 4A and 4B the health parameter analyzing module 306 is configured to track the change in the physiological state of the user on receiving the event with the defined characteristic value of the electronic device. The defined characteristic value of the electronic device 102 may be intensity value of the vibration, value of display characteristic, sound output value and the like. The magnitude of the change in the physiological state of the electronic device 102 varies from person to person and it also depends on the various health parameters such as personal traits, past experiences of the user, psychological mind set, health state, adaption and the like. The change in the physiological state may be the change in heart rate, blood pressure, stress level and the like on receiving the event.

The characteristic adjusting module 308 analyze the change in the physiological state of the user based on the received event on the electronic device. The processor 210 determines the variation in the physiological state (health parameter of the user) exceeding the threshold value which is generated by the learning module 212. The threshold value is generated based on unpleasant or intolerable experience of the user on receiving the event with the defined characteristic on the electronic device. The threshold value depends on the user personal details such as age, gender, profession and the like. The characteristic adjusting module 308 on determining the physiological state/health parameters of the user exceeding the threshold level, may re-calibrate the characteristic value of the electronic device. The re-calibrated/adjusted value of the characteristic of the electronic device 102 is performed by the learning module 212 based on the received events, user activity and the environmental context of the user.

In an embodiment, the customizing system 300 can be configured and includes the context identifying module 302, wherein the context identifying module 302 may include current user activity and an environmental context of the user.

FIGS. 4A and 4B are example diagrams depicting identification of at least one context of an electronic device based on received events and adjusts the characteristics of the electronic device based on a variation on the user's physiological state, according to various embodiments of the disclosure.

The method of customizing the characteristics of the electronic device 102 based on received events is illustrated in FIGS. 4A and 4B. The method of customizing begins with monitoring the events which are received on the background by the electronic device. As illustrated, the events such as calls notification, alarm, screen wake up on wrist and the like are received in the background by the electronic device. The received events are identified by an event detector of the electronic device. Further the current user activity and the environmental context of the user are identified by a context analyzer. The user activity may include the current activity performed by the user at the time of receiving the event. The current user activity may include but not limited to running, jogging, walking, sleeping, standing, sitting, lying awake, resting, cycling, swimming, exercising, workouts, driving, reading, television watching, cooking, hiking, trekking, meeting and the like. The environmental context of the user is identified by the context analyzer, which indicates the current environment of the user while receiving the events. The environment context may include, but not limited to time, place, ambient sound level, part of the day, ambient light, ambient noise, noise level, external context, current location and the like.

Referring to FIGS. 4A and 4B a method of customizing characteristics of an electronic device 102 includes a watch characteristic engine. The characteristic engine is used to identify the current characteristic of the electronic device 102 based on receiving the events, current user activity and environmental context of the user. The received events are sent as input to characteristic invoker which monitor the change in the health parameters of the user on receiving the events with, he defined characteristic of the electronic device. A health reaction analyzer analyses the change in the physiological state of the user by monitoring the change in the health parameters such as change in heart rate, change in blood pressure and stress level of the user. The change in the user's physiological state/health parameter is analyzed and notified to the health change feedback.

Referring to FIGS. 4A and 4B the events and context of the electronic device 102 are passed as input to the dynamic characteristic model. The dynamic characteristic model is configured with the learning modules to re-calibrate the characteristic value of the electronic device. The re-calibrated characteristic value of the electronic device 102 is based on the notified change on the health parameter of the user on receiving the events on the electronic device. In an embodiment, the dynamic characteristic model may include a reinforcement learning module and a pre-trained universal method.

Referring to FIGS. 4A and 4B, the reinforcement learning module includes a contexts based characteristic module, a physiological reactor, a characteristic modifier and user persona. The pre-trained universal method includes a labelled dataset and a policy of the reinforcement learning module.

Figure 4C:
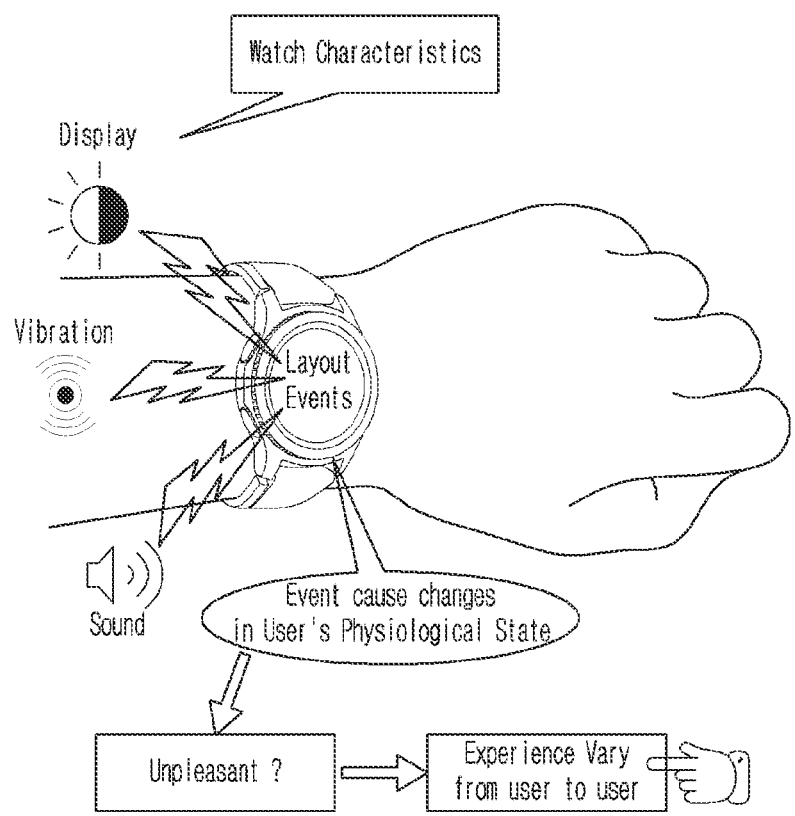
FIG. 4C is an example diagram depicting receiving of events on an electronic device with various characteristics that can cause changes in a user's physiological states, according to an embodiment of the disclosure.

FIG. 4C is an example diagram depicting receiving of events on an electronic device with various characteristic causing changes in a user's physiological states, according to an embodiment of the disclosure.

Referring to FIG. 4C, a user using an electronic device 102 may receive an event notification. The received event may be receiving voice calls/video calls, mail notifications, reminders, alarm notifications, screen wake up, message notifications, and the like. The received event may be notified to the user by the characteristic of the electronic device including vibration, display settings, sound, scaling settings and the like. These characteristics of the electronic device may include spontaneous change in the physiological state of the user may include, but not limited to, the change in hear rate, blood pressure, stress level and the like. The change in physiological state of the user is because of the natural human tendency to fight or flee in reaction to any sudden interaction to vibration, sound, display and the like.

Referring to FIG. 4C, the magnitude of change in the physiological state caused by the invoked event varies from person to person depending on various parameters such as personal traits, based on previous experiences, adaption, psychological mind set, health state and many other factors affecting the personal behavior and the like. For example, the user, on receiving the pre-defined characteristic, can produce the experience from normal to unpleasant change in the physiological state among different users. The unpleasant experience can range from mild stress to severe heart attack. Therefore, the unpleasant experience may include physiological disorder that may include cardiovascular, psychiatric, nervous system disorder, color blindness, sleep disorder and the like.

Figure 5B:
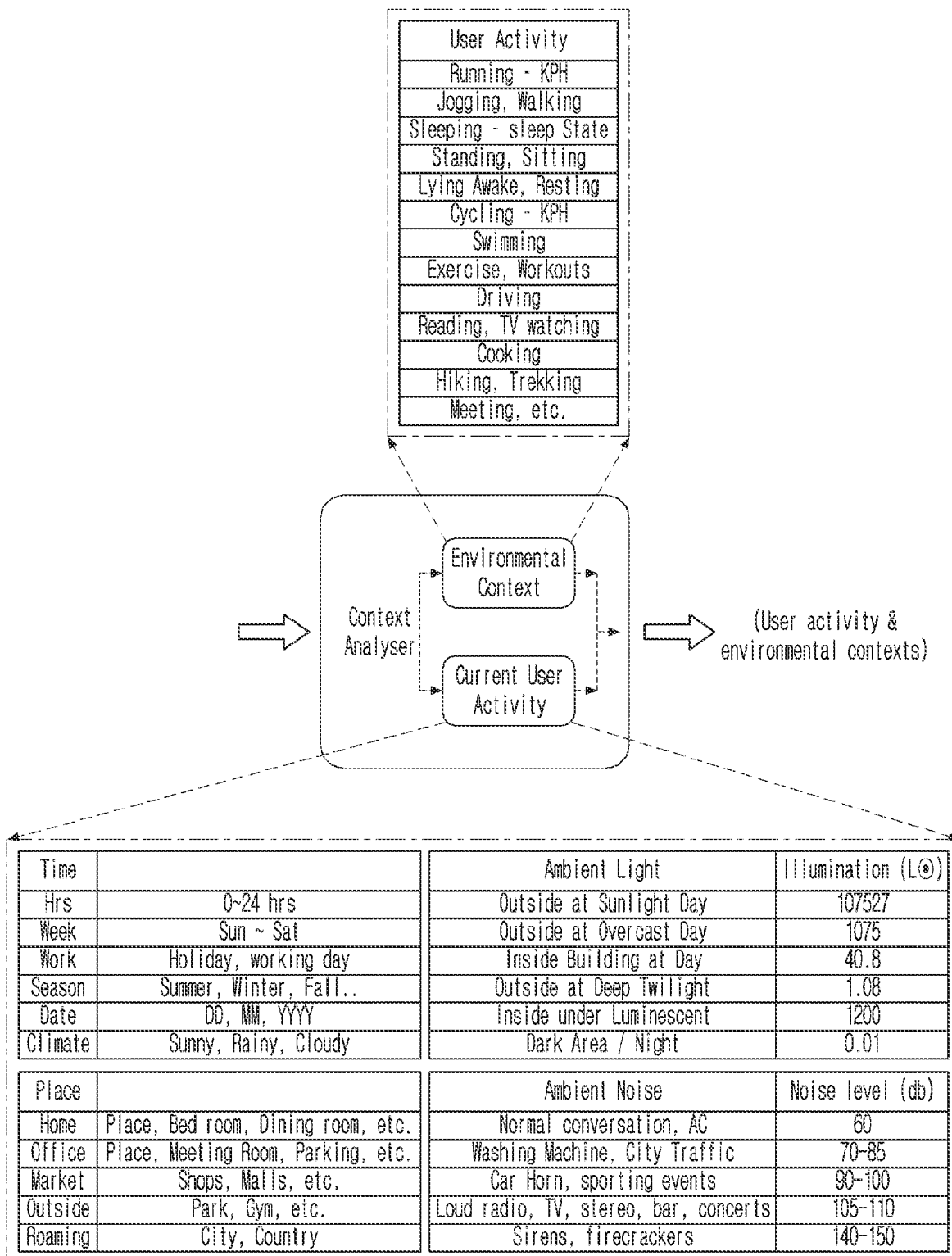
FIG. 5B is an example diagram depicting identification of events and determining current user activity and environmental context to analyze a variation in a user's physiological states, according to an embodiment of the disclosure.

FIGS. 5A and 5B are example diagrams depicting identification of events and determining current user activity and environmental context to analyze the variation in the user's physiological states, according to various embodiments of the disclosure.

Referring to FIGS. 5A and 5B, the diagram illustrates the event identifying module 310, which keeps track of the events invoked in the smart device. The events received include the notification, calls, events and the user operation. The notification which may include but not limited to short message service (SMS), social network services (SNS) (which include, but not limited to, whatsapp, face book, kakao, twitter) and the like. The notification may also include news streaming services such as BBC, CNN, video streaming services (such as, but not limited to, Netflix, Hotstar, Amazon Prime, Voot) and the like. The received events may be receiving calls such as customer service calls, fourth generation (4G)/long term evolution (LTE) calls and application calls and the like. The events may include alarm notification, calendar, memo, reminder, watch application notification. The events may include user operations on the smart computing devices to receive wrist wake up, web browsing, keyboard typing and the like.

Referring to FIGS. 5A and 5B, the diagram illustrates the context identifying module 302 including the current user activity and the environmental context of the user. The current user activity indicates the current activity performed by the user on receiving the events on the electronic device. The user activity may include, but not limited to, running, jogging, walking, sleeping, standing, sitting, lying awake, resting, cycling, swimming, exercising, workouts, driving, reading, television watching, cooking, hiking, trekking, meeting and the like.

Referring to FIGS. 5A and 5B, the diagram illustrates the context identifying module 302 includes the current user activity and the environmental context of the user. The environmental context of the user may include the current environment of the user, while receiving the event. The environment context may include, but not limited to, time, place, ambient sound level, part of the day, ambient light, ambient noise, noise level, external context, current location and the like. The environment context such as time may include, but not limited to hours of the day, days of the week, lists of working days or holidays, seasons of the year, current date, current climate and the like. The environment context such as ambient light with the illumination value may include, but not limited to sunlight day, overcast day, inside the building, outside the twilight, inside the luminescent, dark area, night. The environment context such as place may include, but not limited to home which include bedroom, dining room, guest room, kitchen, backward and the like. The place may include office such as meeting room, parking, pantry, parking, and the like. The place may include market with shops, malls, and the like. The place may include outside of park, gym, roaming the city, roaming outside the country and the like. The environment context such as ambient noise may include, but not limited to normal conversation, air conditioning, with the noise level of 60 decibel, washing machine, city traffic with noise level of 70-80 decibel, car horn, sporting events with the noise level of 90-100 decibel. Loud radio, television, stereo, concerts with noise level of 105-110 decibel and sirens, firecrackers with noise level of 140-150 decibel.

Figure 5C:
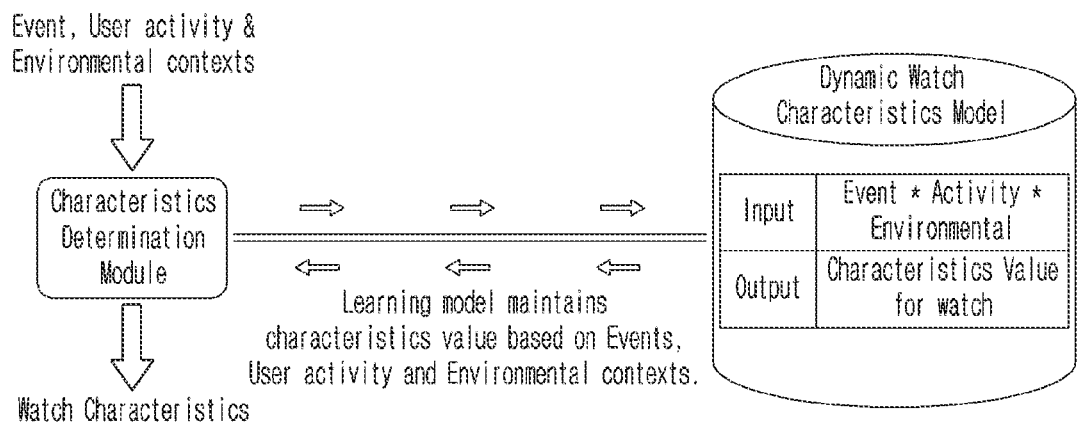
FIG. 5C is an example diagram depicting determining characteristic of an electronic device and an event invoked to the electronic device, according to an embodiment of the disclosure.
Figure 5D:
FIG. 5D is an example diagram depicting determining characteristic of an electronic device and an event invoked to the electronic device, according to an embodiment of the disclosure.

FIGS. 5C and 5D is example diagrams depicting determining characteristic of the electronic device 102 and the event invoked to the electronic device, according to various embodiments of the disclosure.

Referring to FIGS. 5C and 5D, the characteristic determination module receives event, user activity and environmental context of the user. The input received by the characteristic determination module is sent to the dynamic characteristic model. The dynamic characteristic model, on receiving the events, activity and the environmental context of the user, generates the re-calibrated characteristic value for the electronic device 102 received from the learning module 212. The learning module 212 maintains the list of state-value pair for which the state comprises the event, activity and the environment of the user with the pre-defined characteristic value. The pre-defined characteristic value is based on the learning of the user based on the variation of the health parameters/change in the physiological state of the users on receiving the event notification.

FIGS. 5C and 5D, the event is triggered to the electronic device 102 to be notified to the user at the re-calibrated characteristic value. The re-calibrated/adjusted characteristic value may be the new value required to notify the user with the received event. The re-calibrated/adjusted characteristic of the electronic device is provided by the learning module 212. The parameters to notify the user about the received event may include but not limited to the display, sound level, vibration settings, layout settings and the like.

Figure 5E:
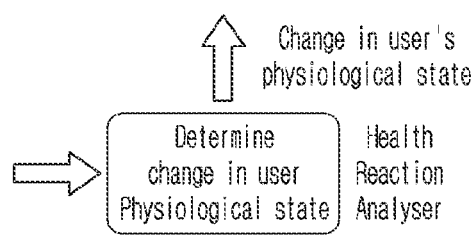
FIG. 5E is an example diagram depicting change in a physiological state of a user on receiving an event by an electronic device, according to an embodiment of the disclosure.

FIG. 5E is an example diagram depicting change in the physiological state of a user on receiving the event by an electronic device, according to an embodiment of the disclosure.

Referring to FIG. 5E, a health reaction analyzer monitors an effect of characteristic on a user's physiological state or health parameters. The user's physiological state or health parameters may monitor the change in the magnitude of the physiological reactions to the occurred events. The variations to the physiological reactions to same event differs for the users depending on the personal traits. Personal traits, may include but not limited to, experience, adaptation, psychological mind set, health state and the like.

Referring to FIG. 5E, as an example, on the occurrence of sudden event, the user may produce mild to heavy psychological change which differs among different users. The change in the physiological state of the user may depend on the following factors such as age, gender, region/country, profession, and the like. For instance, the physiological state of the user may depend on age such as a child of age 7-13 will be more reactive than an aged person on receiving the notification with high vibration and high sound. For the factor (region and country), the Germans are highly reactive to normal sound than people of any other country. For the factor (profession), software/information technology professionals will be highly reactive to normal sounds than factory workers.

Referring to FIG. 5E, the user's physiological state/health parameters are the condition or the state of the body or the bodily functions that make a spontaneous reaction to the received event. The sudden change may lead to change in the heart rate, blood pressure, stress level and the breath rate of the user on receiving the notification. Therefore, the characteristic value of the electronic device 102 corresponding to the event at specific context produces a mild to severe change to the health. This is because of the natural human tendency to fight or flee in the reaction to any sudden on-arrival of the vibration, display and the sound. Hence, a sudden vibration, display, sound may lead to heart rate, blood pressure, stress, breath rate change and the like. The user interaction during specific screens can also result in an increase in the stress level. For example, the user may find it difficult, when typing the extreme sides of the keyword on QWERTY keyboard with small and fat fingers, which can annoy the user and induce stress.

Figure 6:
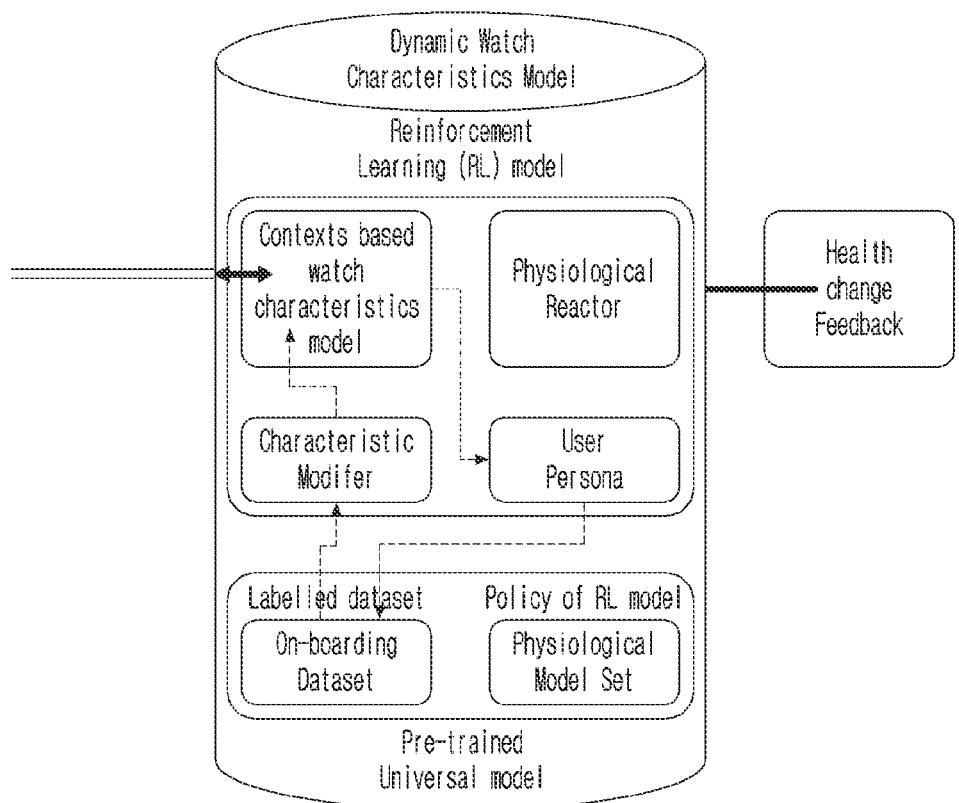
FIG. 6 is an example diagram depicting communication between a learning module and a pre-trained universal method involving various parameters such as characteristics of an electronic device, change in physiological state of a user, according to an embodiment of the disclosure.

FIG. 6 is an example diagram depicting communication between the learning module and a pre-trained universal method involving various parameters such as characteristics of an electronic device, change in physiological state of a user, according to an embodiment of the disclosure.

Referring to FIG. 6, contexts based characteristic module of a learning module holds a state-value pair dataset of a learning module 212. The state holds the list of permutation of events, user activity and the environmental contexts of the user. The value holds the list of characteristics for each permutation of states. For example, the state-value pair which may hold as mentioned below:

State=[Event={"SMS Notification"}, User Activity={"Sleeping"}, Environment={"11 PM", "Home", "Silent", "Dark"}]

Value=[Vibration="50", Display="Grey Scaling", Sound="0"].

As mentioned above, the contexts based characteristic model holds various state value pairs based on previous learnings of the user from the variation of the health parameter of the user on receiving the events to the electronic device 102.

Referring to FIG. 6, the reinforcement learning module includes a physiological reactor, which receives the magnitude of the user's change in the physiological state, corresponding to the state received. The physiological reactor receives a notification of a change in the health parameter from the health change feedback. The reinforcement learning module includes a user persona, which holds personal information of the user which may include age, gender, region, profession of the user and the like. The reinforcement learning module includes a characteristic modifier, which receives a new characteristic value corresponding to the received state (e.g., an event received by the device, user activity, and environmental context of the user).

Referring to FIG. 6, the pre-trained universal method includes a labelled dataset and policy of the reinforcement learning module. The labelled dataset comprises an on-boarding dataset which holds a dataset of "state-value" pair, which is generated from the crowdsourcing. The generated dataset is based on user persona which includes age, gender, country and the like. The policy of the reinforcement learning module defines the way of behaving at a given state. The way of behaving relates to generating a new characteristic value for the electronic device 102 at the given state (event received by the device, user activity and environmental context of the user).

Therefore, as depicted in FIG. 6, if the change in the health parameter of the user exceeds the threshold value generated from the crowdsource based on the user persona (user personal details), the reinforcement learning module re-calibrates the characteristic value of the electronic device.

Initially, the onboarding dataset of the pre-trained universal learning module is empty. The learning module on-boards the initial dataset by passing the user persona value. For example, the contexts based characteristic model passes the details of the user persona to the labelled dataset of the pre-trained universal model, further the labelled state-value pair dataset is sent to the characteristic modifier to set the state-value dataset of the learning module, finally the contexts based characteristic model receives the initial dataset based on user persona. Therefore, on-boarding data set is used only when the learning module is empty for on-boarding initial data sets, based on user persona for initializing the electronic device 102 with the characteristic value. As depicted in FIG. 6, the interaction between the reinforcement learning module and the pre-trained universal method is performed by sending the user persona details.

Figure 7A:
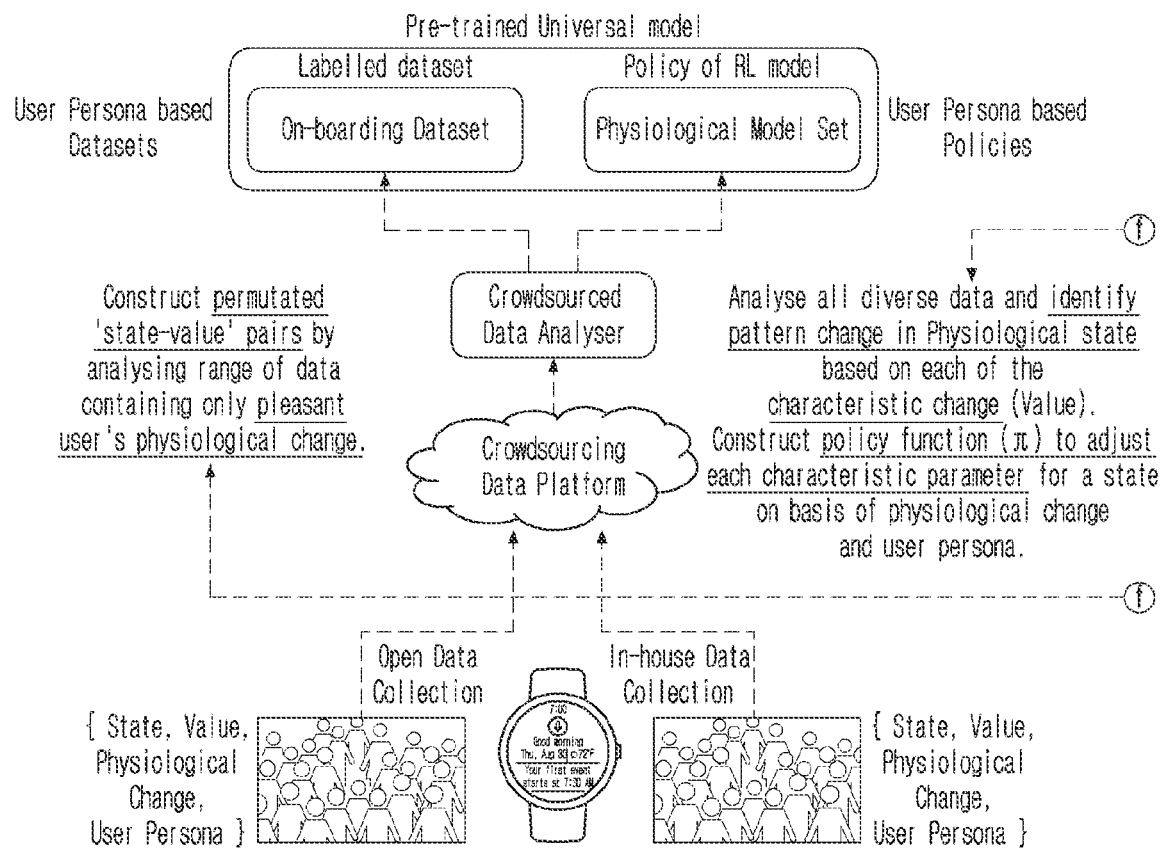
FIG. 7A is an example diagram depicting a pre-trained universal method comprising labelled dataset and a policy of a learning module receiving crowdsourced data based on identified pattern change in a physiological state of a user based on characteristic change of an electronic device, according to an embodiment of the disclosure.

FIGS. 7A and 7B are example diagrams depicting a pre-trained universal method comprising labelled dataset and the policy of the learning module receiving crowdsourced data based on identified pattern change in the physiological state of the user based on characteristic change of an electronic device, according to various embodiments of the disclosure.

Referring to FIGS. 7A and 7B, pre-trained universal method is a learning module, which learns from a change in physiological state of a user based on received characteristic value of the user. The physiological change in the user is based on the state (e.g., comprising event, user activity, and/or environment).

FIGS. 7A and 7B depict a tabular column indicating the change in the physiological state, user persona, state and the characteristic value of the received notification. In an embodiment, the state of the user may be [Event={"SNS Notification"}, User Activity={"Sleeping"}, Environment={"11 PM", "Home", "Silent", "Dark"}] for which the characteristic value of the user may be [Vibration="50", Display="Grey Scaling", Sound="0"], User Persona may be [Age="15", Gender="M", Region="US", Profession="IT"] for which the physiological change may be [Heart Rate="20", Stress="20"], which indicates that the change in the physiological state of the user is unpleasant due to an increase in the physiological state of the user greater than the threshold value. The pre-trained universal method keeps track of all the change in the physiological state of the user in a similar manner, on receiving the events on the electronic device. The pre-trained universal method keeps track of changes in the physiological state and considers that the user is having a pleasant experience when the physiological state less than the threshold value.

The pre-trained universal method analyzes diverse data and identifies any pattern change(s) in the physiological state, based on the characteristic value. Therefore, the learning module 212 constructs a policy function (t) to adjust each characteristic parameter for the state based on physiological change and user persona, which is defined as user persona-based policies. The policy function (π) generates the new characteristic value to be adjusted on the electronic device on receiving the notification. The policy function (π) is constructed by mapping the occurred event, current user activity and the environmental context of the user with the generated new characteristic value of the electronic device 102. The user personal based details are sent to the reinforcement learning module. Based on the change in the physiological state and the user personal details the pre-trained universal method constructs a list of occurred events, current user activity and the environmental context to the characteristic value of the electronic device. Therefore, the pre-trained universal method constructs a permutated state-value pairs. The state-value pairs comprise the occurred event, current user activity and the environmental context of the user. The state-value pair can be obtained by analyzing the range of data containing only pleasant user's physiological change, which is defined as user persona-based datasets. The constructed state-value pairs are sent to the labelled dataset of the universal learning module which is termed as labelled dataset.

The user persona-based datasets and user persona-based policies are sent to a crowd sourcing data platform through a crowd sourcing data analyzer. If the considerable physiological change is greater than threshold value, then it can be considered as an unpleasant experience. If the physiological change is less than or equal to the threshold value, then it can be considered as a pleasant experience. The crowd sourcing data platform may be a platform in which an authenticated user may obtain the information about a large group of people related to business, personal information, and the like, to receive knowledge. The crowd sourcing data platform allows the user to receive knowledge regarding the individuals details in the group or the organization. For example, the pre-trained universal learning module may fetch the data from the crowd sourcing database based on the user persona details.

Figure 8B:
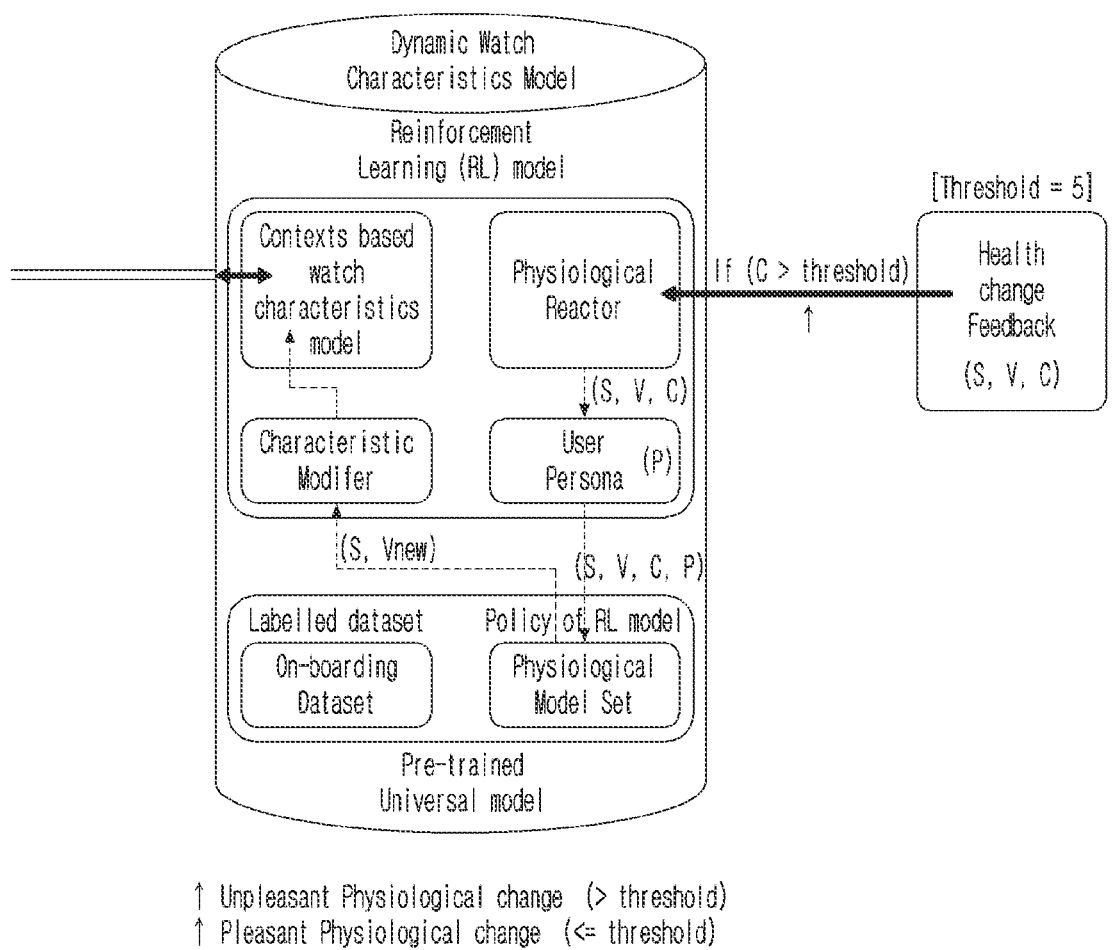
FIG. 8B is an example diagram depicting a calculation of a threshold value to adjust a characteristic of an electronic device, according to an embodiment of the disclosure.

FIGS. 8A and 8B are example diagrams depicting a calculation of a threshold value to adjust a characteristic of an electronic device, according to various embodiments of the disclosure.

Referring to FIGS. 8A and 8B, physiological change of a user is assumed as "C" for a particular state "S" and a characteristic value "V" for user persona "P". In an embodiment herein, the health change feedback identifies that the physiological state "C" exceeds the threshold value, health change feedback sends state, characteristic value and the user persona (S, V, C) to the physiological reactor. The physiological reactor fetches user persona (P) and send (S, V,C,P) to the policy of the reinforcement model. For example state (S)=Event={"SNS Notification"}, User Activity={"Sleeping"}, Environment={"11 PM", "Home", "Silent", "Dark"}], Value (V)=[Vibration="50", Display="Grey Scaling", Sound="0"], Physiological change (C)=[Heart Rate="20", Stress="20"] and User Persona (P)= [Age="15", Gender="M", Region="US", Prof="IT"]. Therefore, the policy of the reinforcement model identifies an indicative new characteristic value (Vnew) based on S, V, P, and magnitude of C. Hence, π(S, V, P, C)=Vnew where π is policy function inside the policy model. As depicted in FIGS. 8A and 8B, the characteristic value of the device is modified (Vnew) with respect to the state (S).

State (S)=[Event={"SNS Notification"},
User Activity={"Sleeping"},
Environment={"11 PM", "Home", "Silent", "Dark"}]
and
Modified Value (Vnew)=[Vibration="40", Display="Grey Scaling", Sound="0"]
Therefore, (S, Vnew) pair="characteristic modifier"=Apply to learning module dataset.

In an embodiment herein, the learning module 212 generates a unique dataset for each unique user. For example, if the electronic device is shared/worn by three family members (father, mother and son), three learning datasets are generated. The current active dataset will depend on the user who is currently using the electronic device 102. It can be identified either through the User Account currently being used on the electronic device 102 or a user identification (which can be a biometric identification, etc.).

In an embodiment herein, the electronic device performs transfer learning in which the learned dataset can be used on different electronic devices. For example, if the user has purchased a new smart watch, the learned dataset from the user's previous smart watch can be used to on-board the learning dataset on the new watch. In this way, the dataset on the new watch does not need to be retrained. The user can save the learned dataset from the cloud or locally and port/re-used it later anytime to same or different devices (through Backup and Restore). For example, when the user resets the watch, it erases all user data; before erasing, the user can do backup and after erasing, restore the user data.

FIGS. 9A, 9B, 10A, 10B, 11A, 11B, 12A, 12B, 13A, and 13B are example diagrams depicting various events occurring on an electronic device when a user performs various activities and the corresponding change performed to the characteristic of the electronic device, according to various embodiments of the disclosure.

Figure 9A:
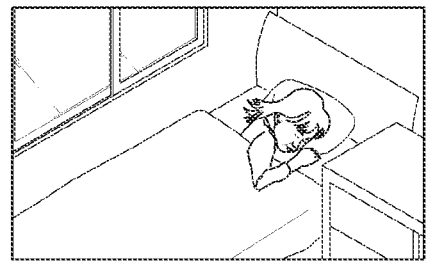
FIG. 9A is the example diagram depicting various events occurring on an electronic device when a user performs various activities and a corresponding change performed to a characteristic of the electronic device, according to an embodiment of the disclosure.
Figure 9A:
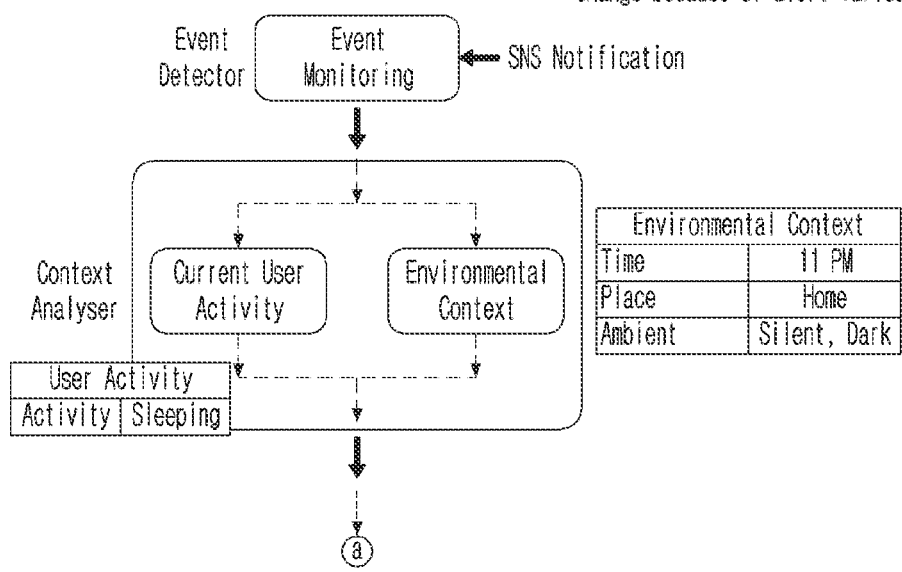
Figure 9B:
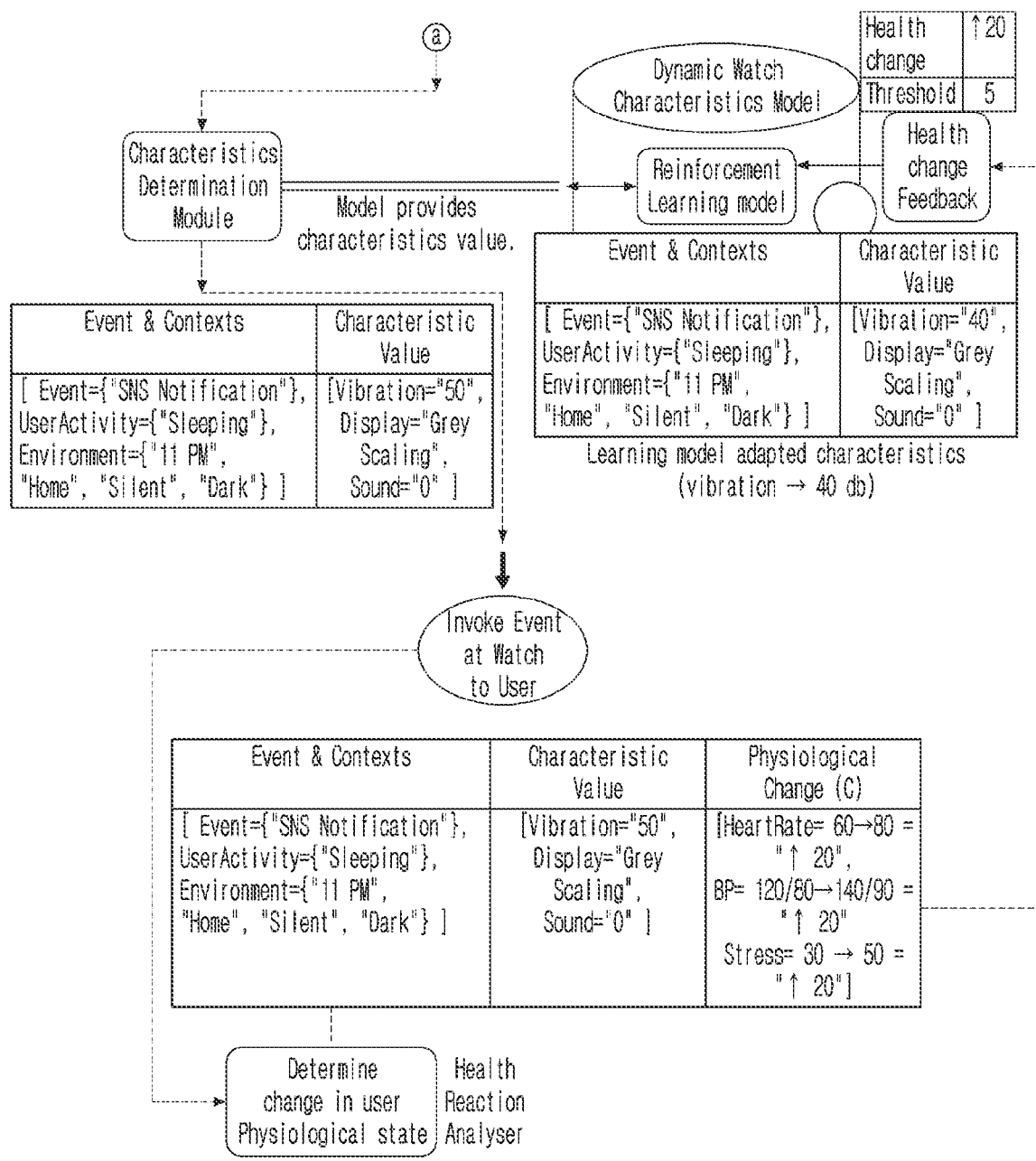
FIG. 9B is the example diagram depicting various events occurring on an electronic device when a user performs various activities and a corresponding change performed to a characteristic of the electronic device, according to an embodiment of the disclosure.

Referring to FIGS. 9A and 9B, an example shows a notification received by a user, while sleeping and tracking of a change in a physiological state of the user, on receiving the event.

Referring to FIGS. 9A and 9B, the received SNS notification is being monitored by the event detector and the context analyzer analyzes the current user activity and the environmental context. The current user activity may be sleeping and the environment context comprising time at 11 PM, place at home and ambient is silent and dark. Further the characteristic determination module may determine the characteristic value of the electronic device based on received context. For instance, the characteristic value may include the vibration="50", Display="Grey Scaling", Sound="0" for the received [Event={"SNS Notification", User Activity={"Sleeping"}, Environment={"11 PM"

"Home", "Silent", "Dark"}]. As depicted in FIGS. 9A and 9B, the change in the physiological state [Heart Rate=60→80="20", Blood Pressure=120/80→140/90="20" and Stress=30→50="20"]. The threshold value=5. From the example, the increase in the physiological change is 20, therefore the increase in the physiological state may cause an unpleasant experience to the user. Then, the dynamic characteristic model is invoked with the received user activity, environment context, the characteristic value of the device and the change in the physiological state of the user is identified by the dynamic characteristic model. The dynamic characteristic model indicates that the change causes unpleasant experience to the user can be due to an increase in the physiological state of the user which is greater than the threshold value.

Also, the pre-trained universal method can track the change in the physiological state of the user on receiving the events on the electronic device.

Referring to FIGS. 9A and 9B, the reinforcement learning module includes user persona which holds personal information of the user including age, gender, region, profession of the user and the like. The reinforcement learning module receives a new characteristic value corresponding to the received state (event received by the device, user activity and environmental context of the user). The reinforcement learning module sends the new characteristic value or the re-calibrated characteristic value to the characteristic determination module to be adjusted by the electronic device 102.

Figure 10A:
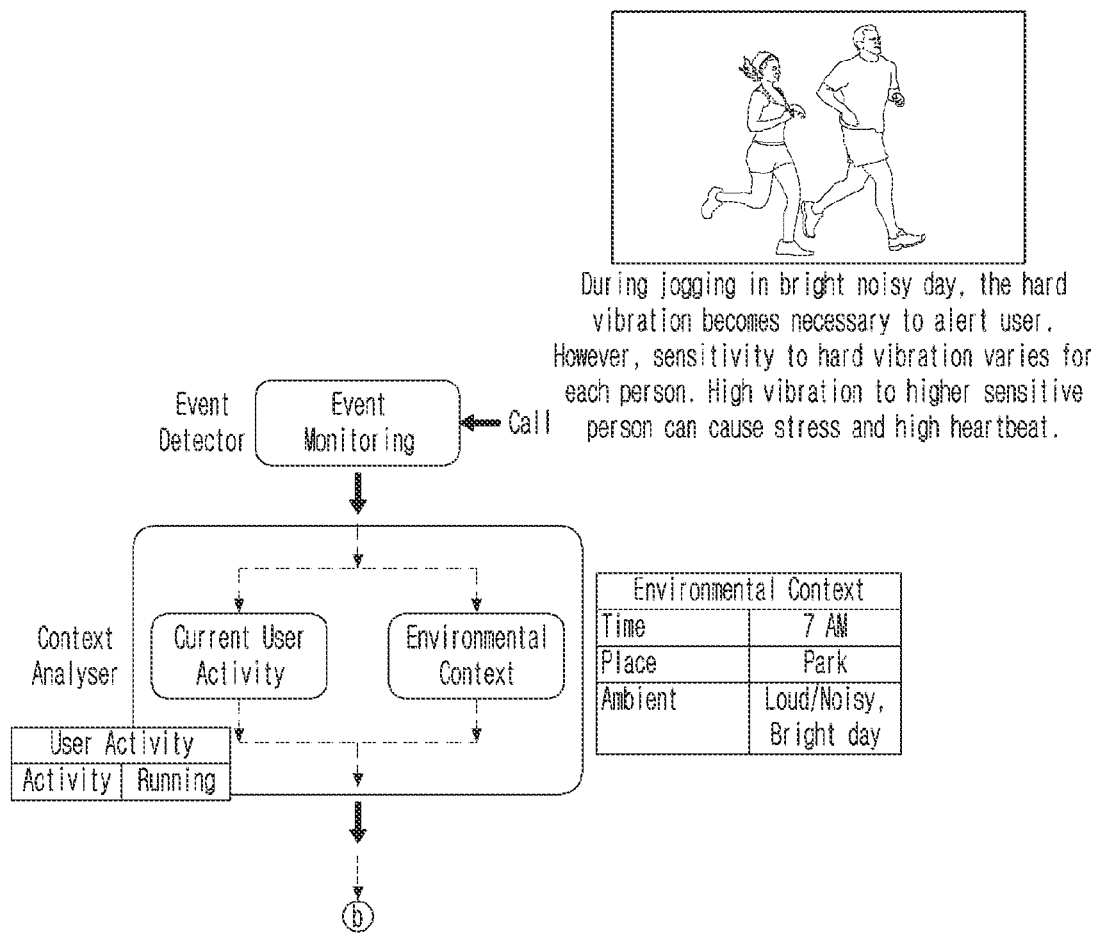
FIG. 10A is the example diagram depicting various events occurring on an electronic device when a user performs various activities and a corresponding change performed to a characteristic of the electronic device, according to an embodiment of the disclosure.

FIG. 10A is an example diagram depicting various events occurring on an electronic device when a user performs various activities and corresponding change performed to characteristic of the electronic device, according to an embodiment of the disclosure.

Figure 10B:
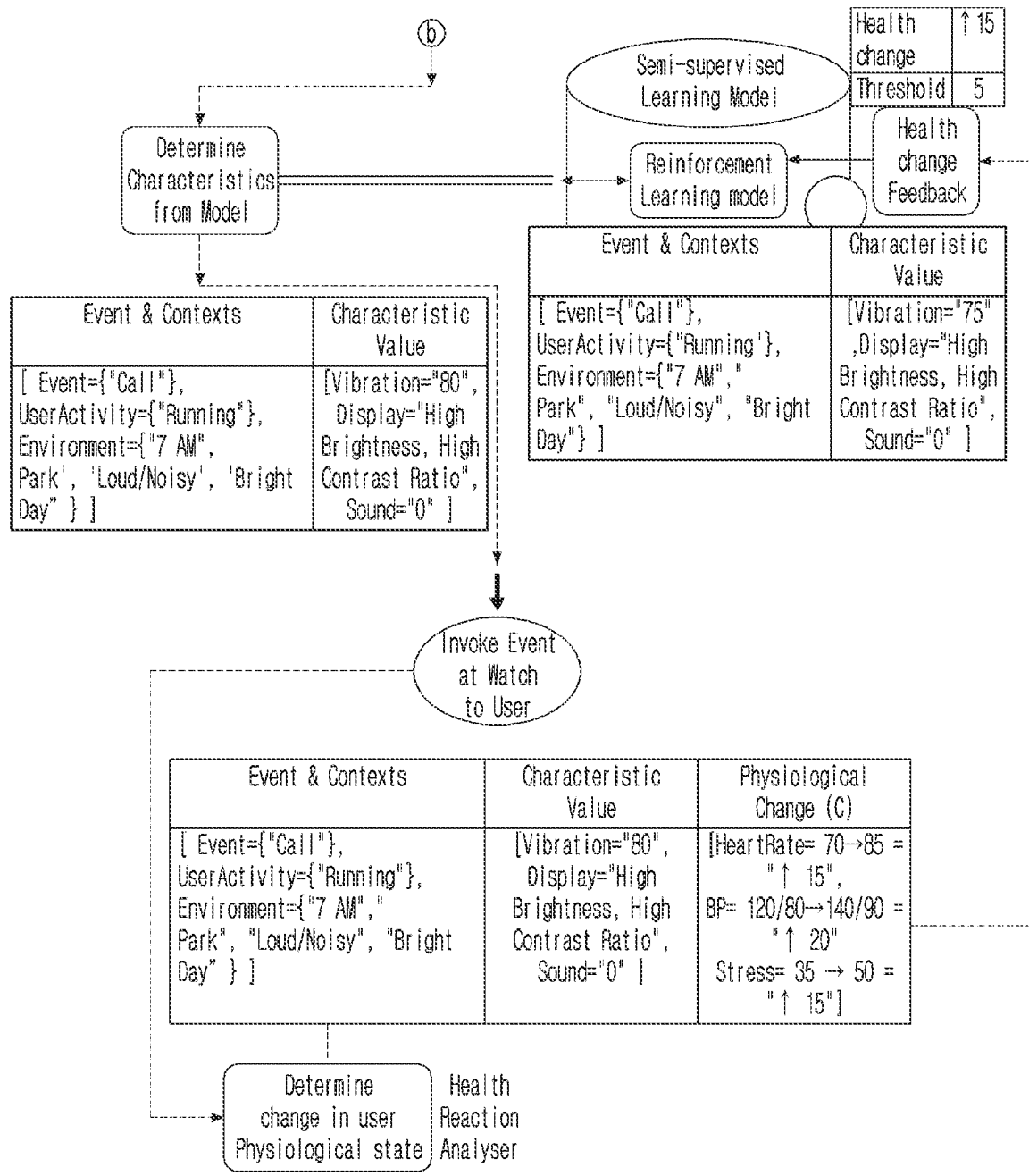
FIG. 10B is an example diagram depicting various events occurring on an electronic device when a user performs various activities and a corresponding change performed to a characteristic of the electronic device, according to an embodiment of the disclosure.

FIG. 10B is an example diagram depicting various events occurring on an electronic device when a user performs various activities and the corresponding change performed to characteristic of the electronic device, according to an embodiment of the disclosure.

Referring to FIGS. 10A and 10B, on a user receiving a call while jogging on a bright noisy day, the user can be alerted by a hard vibration. Also, the sensitivity to the hard vibration varies from person to person, also high vibration to an extremely sensitive person may cause stress and heart attack. The received call being monitored by the event detector, The context analyzer analyzes the current user activity and the environmental context. The current user activity is jogging/running and the environment context comprising time at 7 AM, place at park and ambient is loud, noisy, and a bright day. Further, the characteristic determination module may determine the characteristic value of the electronic device based on received context. For instance, the characteristic value may include the vibration="80", Display="High Brightness, High Contrast Ratio", Sound="0" for the received [Event={"Call", User Activity={"Running"}, Environment={"7 AM" "Park", "loud/noisy", "Bright day"}]. As depicted in FIGS. 10A and 10B, the change in the physiological state [Heart Rate=70→85="15", Blood Pressure=120/80→140/90="20" and Stress=35→50="15"]. The threshold value=5. From the example, the increase in the physiological change is 15, therefore the increase in the physiological state may causes unpleasant experience to the user. Then, the dynamic characteristic model is invoked with the received user activity, environment context, the characteristic value of the device and change in the physiological state of the user is identified. It indicates that the change causes an unpleasant experience to the user, due to the increase in the physiological state of the user which is greater than the threshold value.

Referring to FIGS. 10A and 10B, the reinforcement learning module includes user persona which holds personal information of the user including age, gender, region, profession of the user and the like. The reinforcement learning module receives a new characteristic value corresponding to the received state (event received by the device, user activity and environmental context of the user). Therefore, the reinforcement learning module sends the new characteristic value or the re-calibrated characteristic value to the characteristic determination module to be adjusted by the electronic device 102.

Figure 11A:
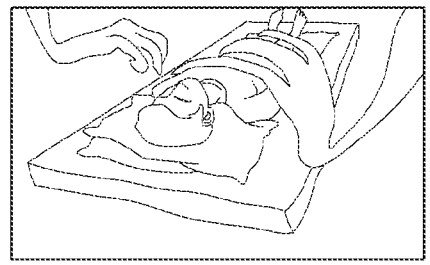
FIG. 11A is an example diagram depicting various events occurring on an electronic device when a user performs various activities and a corresponding change performed to a characteristic of the electronic device, according to an embodiment of the disclosure.
Figure 11A:
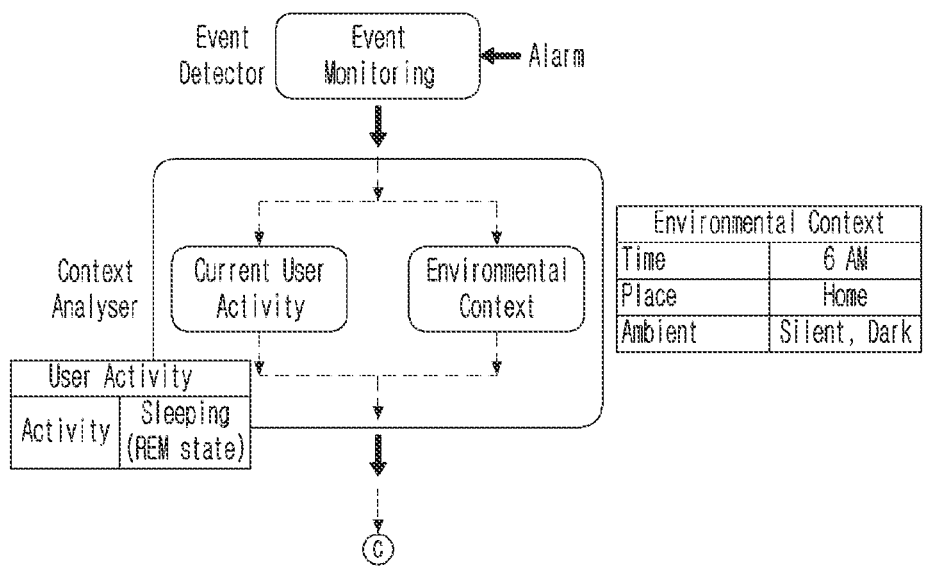

FIG. 11A is an example diagram depicting various events occurring on an electronic device when a user performs various activities and a corresponding change performed to characteristic of the electronic device, according to an embodiment of the disclosure.

Figure 11B:
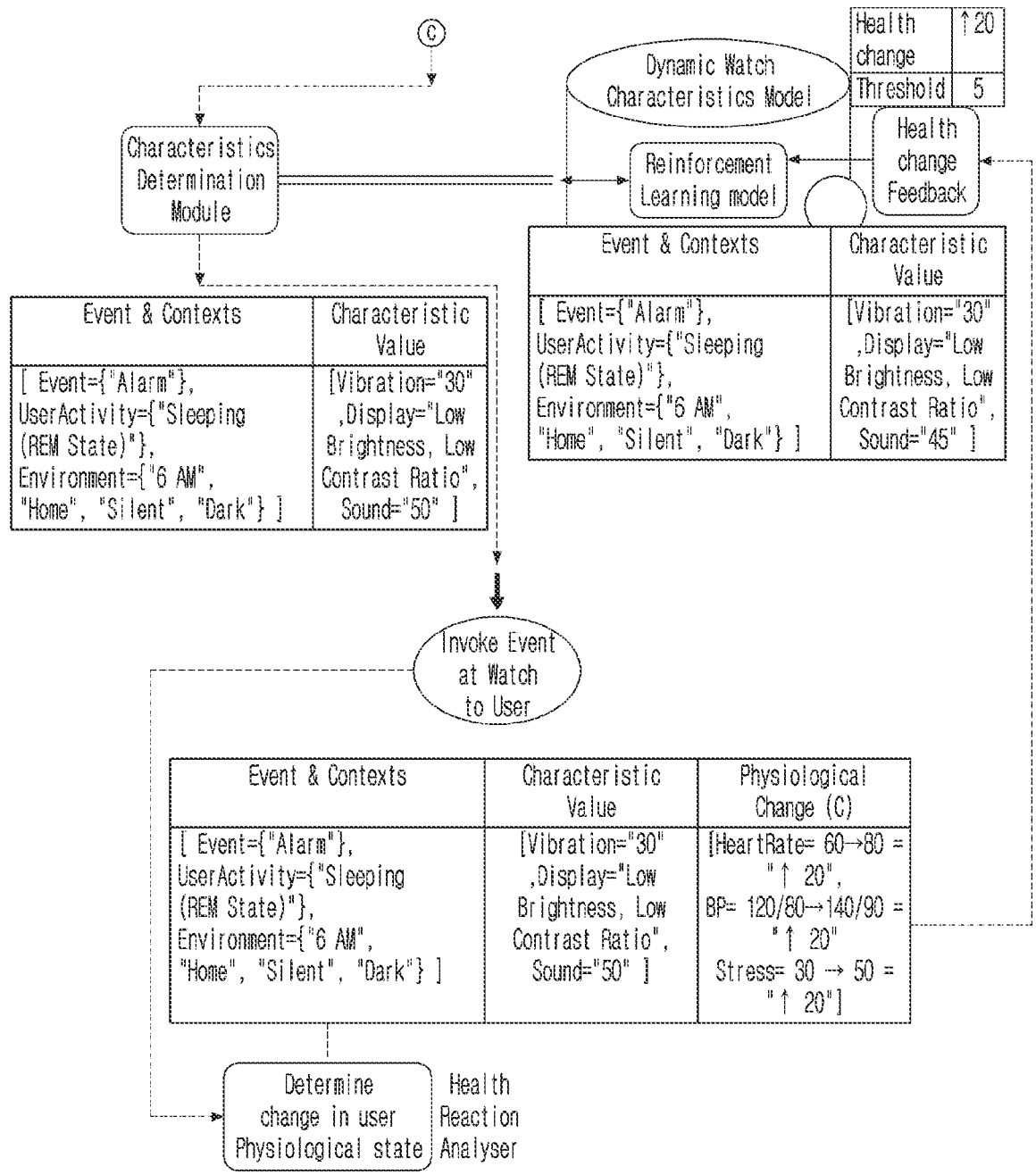
FIG. 11B is an example diagram depicting various events occurring on an electronic device when a user performs various activities and a corresponding change performed to a characteristic of the electronic device, according to an embodiment of the disclosure.

FIG. 11B is an example diagram depicting various events occurring on an electronic device when a user performs various activities and a corresponding change performed to a characteristic of the electronic device, according to an embodiment of the disclosure.

Referring to FIGS. 11A and 11B, a user while sleeping receives an alarm reminder (which is being monitored by an event detector). The context analyzer analyzes the current user activity along the environmental context. The current user activity may be sleeping and the environment context comprises time at 6 AM, place at home and ambient is silent and dark. Further, the characteristic determination module may determine the characteristic value of the electronic device based on received context. For instance, the characteristic value may include the vibration="30", Display="Low Brightness, Low Contrast Ratio", Sound="50" for the received [Event={"Alarm", User Activity={"Sleeping", "REM State"}, Environment={"6 AM" "Home", "Silent", "Dark"}]. As depicted in FIGS. 11A and 11B, the change in the physiological state [Heart Rate=60→80="20", Blood Pressure=120/80→140/90="20" and Stress=30→50="20"]. The threshold value=5. From the example, the increase in the physiological change is 20, therefore the increase in the physiological state may causes unpleasant experience to the user. Then, the dynamic characteristic model is invoked with the received user activity, environment context, the characteristic value of the device and change in the physiological state of the user is identified. It indicates that the change causes an unpleasant experience to the user due to increase in the physiological state of the user which is greater than the threshold value.

Referring to FIGS. 11A and 11B, the reinforcement learning module includes a user persona which holds personal information of the user including age, gender, region, profession of the user and the like. The reinforcement learning module receives new characteristic value corresponding to the received state (event received by the device, user activity and environmental context of the user). Therefore, the reinforcement learning module sends the new characteristic value or the re-calibrated characteristic value to the characteristic determination module to be adjusted by the electronic device 102.

Figure 12A:
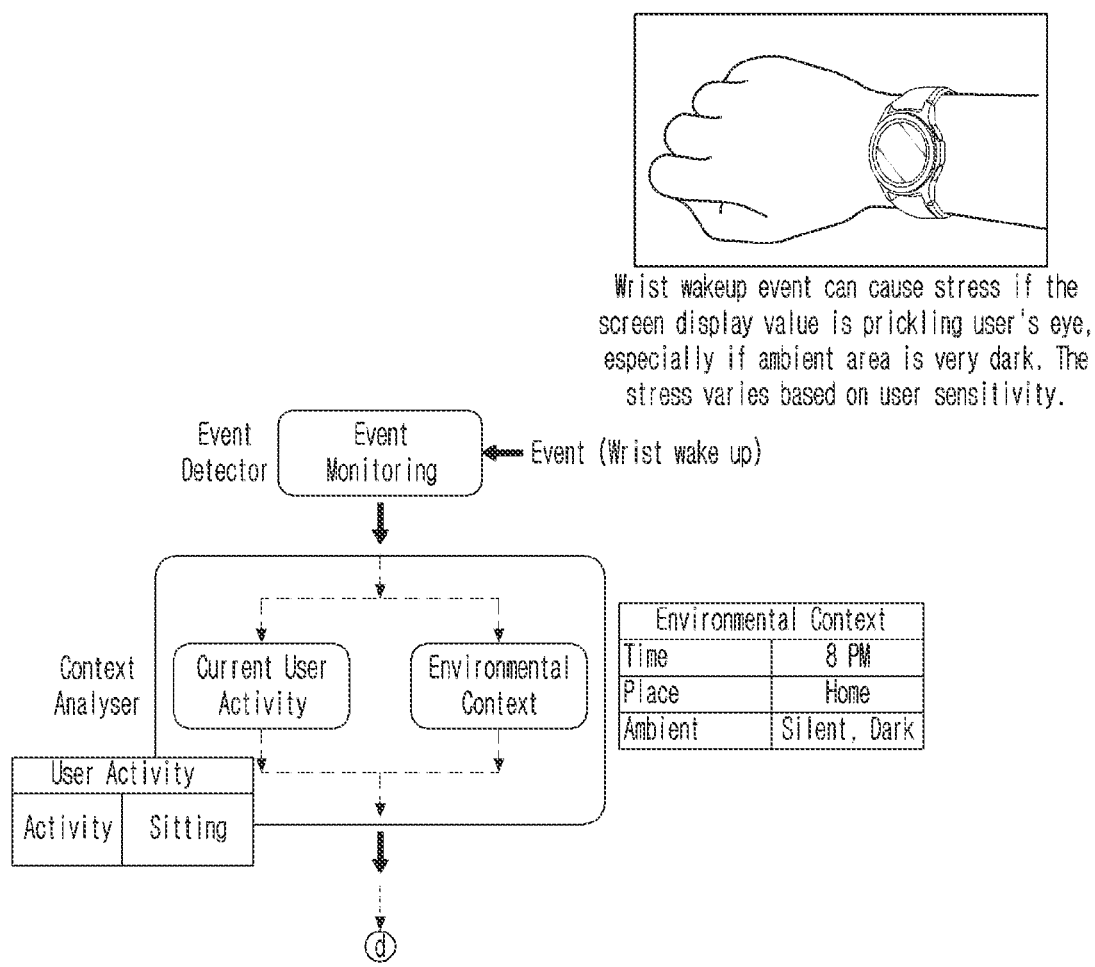
FIG. 12A is an example diagram depicting various events occurring on an electronic device when a user performs various activities and a corresponding change performed to a characteristic of the electronic device, according to an embodiment of the disclosure.

FIG. 12A is an example diagram depicting various events occurring on an electronic device when a user performs various activities and a corresponding change performed to a characteristic of the electronic device, according to an embodiment of the disclosure.

Figure 12B:
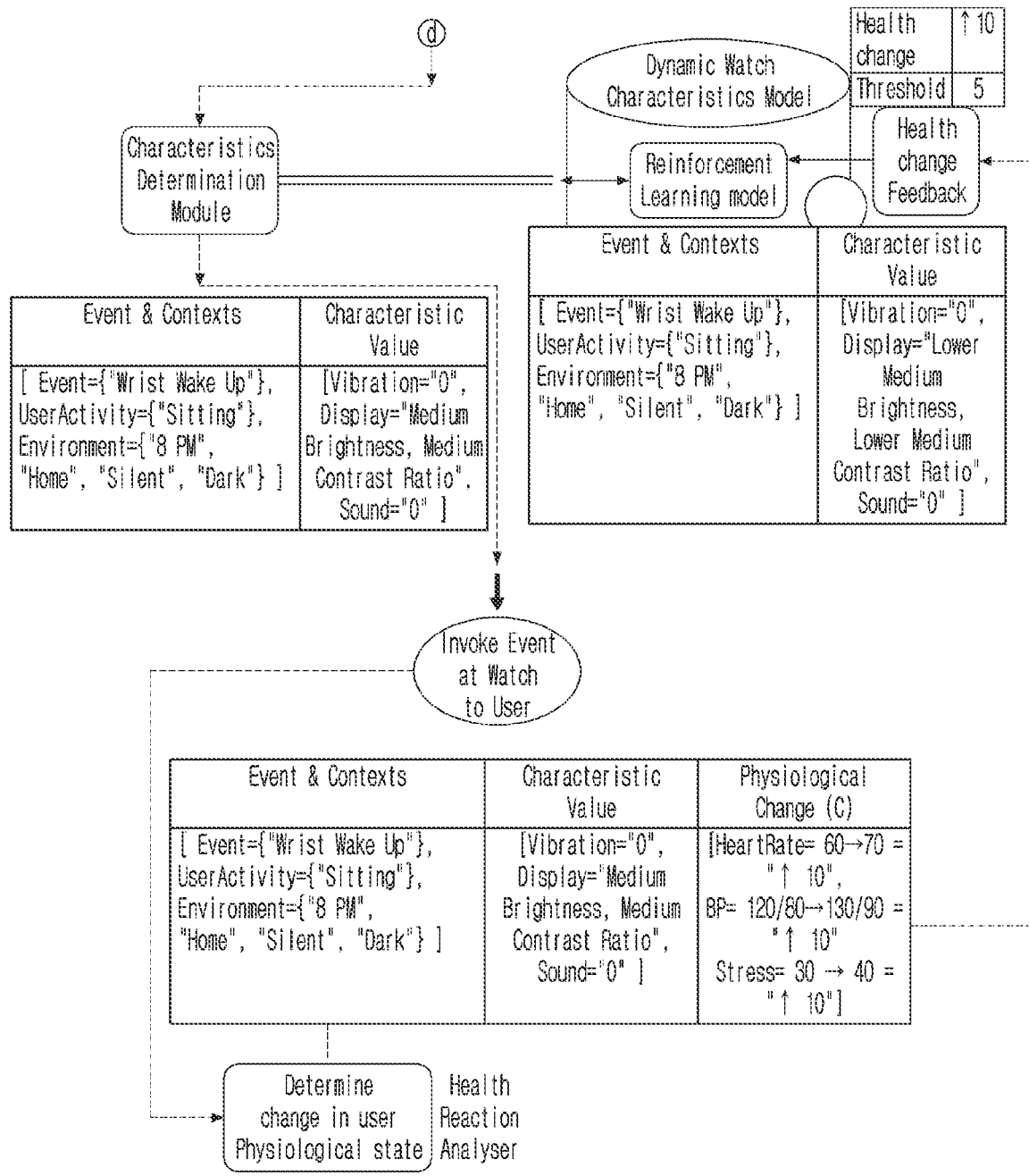
FIG. 12B is an example diagram depicting various events occurring on an electronic device when a user performs various activities and a corresponding change performed to a characteristic of the electronic device, according to an embodiment of the disclosure.

FIG. 12B is an example diagram depicting various events occurring on an electronic device when a user performs various activities and a corresponding change performed to a characteristic of the electronic device, according to an embodiment of the disclosure.

Referring to FIGS. 12A and 12B, a user while sitting receives a wrist wake up event (which is being monitored by the event detector). The context analyzer analyzes the current user activity and the environmental context. The wrist wake up event may cause stress, if the screen display value prickles the user's eye, especially if ambient area is very dark. Also, the stress varies based on user sensitivity. The current user activity may be sitting/resting and the environment context comprises time at 8 PM, place at home and ambient is silent and dark. Further, the characteristic determination module may determine the characteristic value of the electronic device based on the received context. For instance, the characteristic value may include the vibration="0", Display="Medium Brightness, Medium Contrast Ratio", Sound="0" for the received [Event={"Wrist Wake up", User Activity={"Sitting"}, Environment={"8 PM" "Home", "Silent", "Dark"}]. As depicted in FIGS. 12A and 12B, the change in the physiological state [Heart Rate=60→70="10", Blood Pressure=120/80→130/90="10" and Stress=30→40="10"] on receiving the event. The threshold value=5. From the example, the increase in the physiological change is 10, therefore the increase in the physiological state may causes unpleasant experience to the user. Then, the dynamic characteristic model is invoked with the received user activity, environment context, the characteristic value of the device and the change in the physiological state of the user is identified. It indicates that the change causes an unpleasant experience to the user, due to an increase in the physiological state of the user, which is greater than the threshold value.

Referring to FIGS. 12A and 12B, the reinforcement learning module includes a user persona which holds personal information of the user including age, gender, region, profession of the user and the like. The reinforcement learning module receives the new characteristic value corresponding to the received state (event received by the device, user activity and environmental context of the user). Therefore, the reinforcement learning module sends the new characteristic value or the re-calibrated characteristic value to the characteristic determination module to be adjusted by the electronic device 102.

Figure 13A:
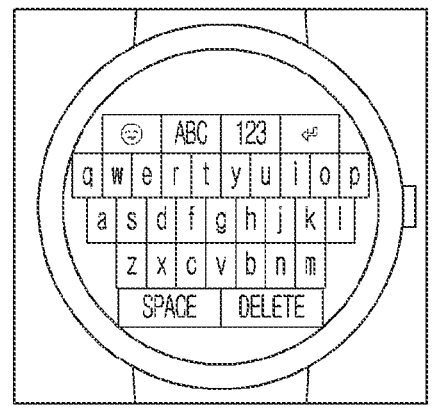
FIG. 13A is an example diagram depicting various events occurring on an electronic device when a user performs various activities and a corresponding change performed to a characteristic of the electronic device, according to an embodiment of the disclosure.
Figure 13A:
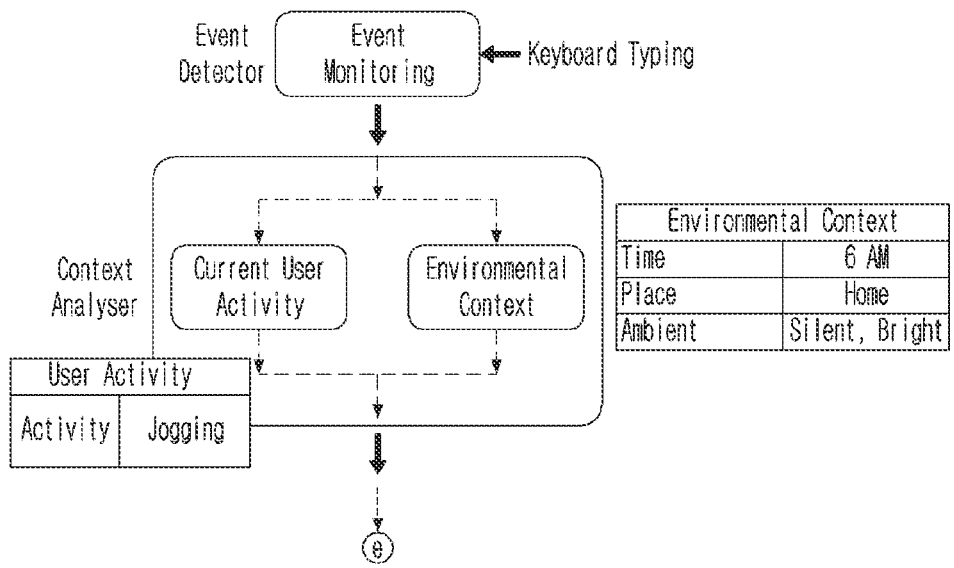

FIG. 13A is an example diagram depicting various events occurring on an electronic device when a user performs various activities and a corresponding change performed to a characteristic of the electronic device, according to an embodiment of the disclosure.

Figure 13B:
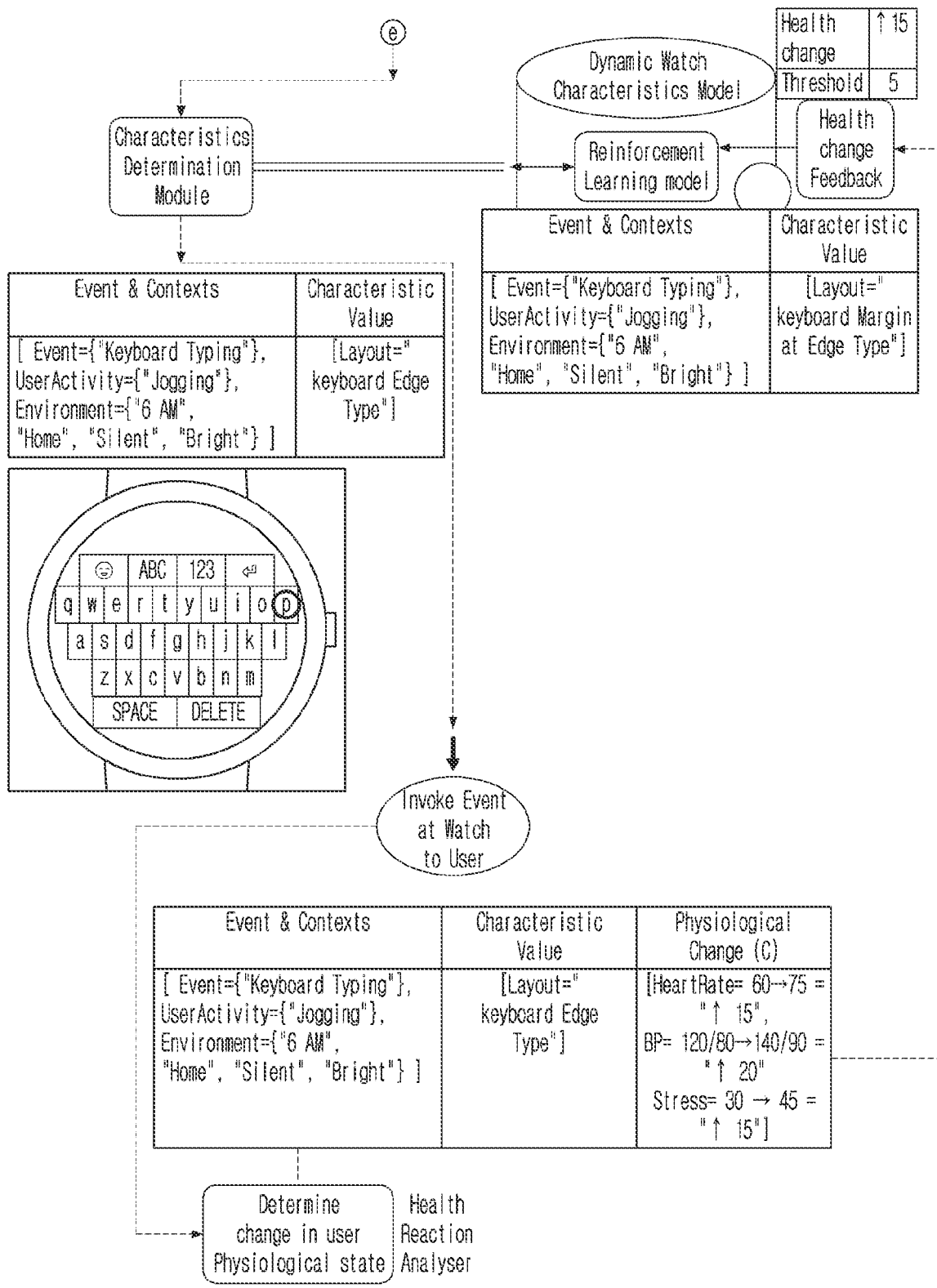
FIG. 13B is an example diagram depicting various events occurring on an electronic device when a user performs various activities and a corresponding change performed to a characteristic of the electronic device, according to an embodiment of the disclosure.

FIG. 13B is an example diagram depicting various events occurring on an electronic device when a user performs various activities and a corresponding change performed to a characteristic of the electronic device, according to an embodiment of the disclosure.

Referring to FIGS. 13A and 13B, a user types using keyboard keys of an electronic device 102. The user may be stressed when facing difficulty in typing specific keys at the extreme edge of the keyboard. For the key typing event, the characteristic value Layout="Key board Edge typing" for which the Event={"Keyboard typing"}, User Activity={"Jogging"}, Environment={"6 AM", "Home", "Silent", "Bright"}. For the received event the user may have the change in the physiological state [Heart Rate=60→75="15", Blood Pressure=120/80→140/90="20" and Stress=30→45="15"]. The threshold value=5. From the example, the increase in the physiological change is 15, therefore the increase in the physiological state may causes unpleasant experience to the user. Then, the dynamic characteristic model is invoked with the received user activity, environment context, the characteristic value of the device and the change in the physiological state of the user is identified. It indicates that the change causes an unpleasant experience to the user, due to an increase in the physiological state of the user which is greater than the threshold value.

Referring to FIGS. 12A and 12B, the reinforcement learning module includes user persona which holds personal information of the user including age, gender, region, profession of the user and the like. The reinforcement learning module receives a new characteristic value corresponding to the received state (event received by the device, user activity and environmental context of the user). Therefore, the reinforcement learning module sends the new characteristic value or the re-calibrated characteristic value to the characteristic determination module to be adjusted by the electronic device 102.

Figure 14:
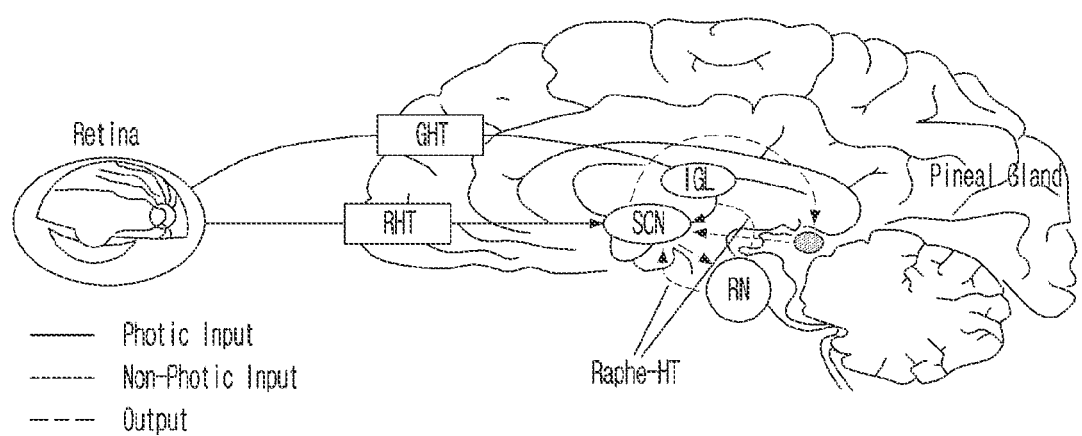
FIG. 14 is an example diagram depicting a display parameter alerting a physiological state of a user, according to an embodiment of the disclosure.

FIG. 14 is an example diagram depicting a display parameter alerting a physiological state of a user, according to an embodiment of the disclosure.

Referring to FIG. 14, an electronic device may comprise an AMOLED display screen. The AMOLED display screen may provide greater contrast ratios with a wider difference between the lightest and the darkest part of the screen. The AMOLED display screen may also provide enriched brightness with more levels of brightness control with more color accuracy. The AMOLED display screen may provide grey scaling, which turns the screen to grey channel, which can be ideal during sleep time to prevent exposure to sudden physiological spikes. The display screen may provide opacity with values define the transparency, which provide required color mix with the background color. The display screen provides a color filter based on color components, which can enable avoidance of blue component(s), which can cause physiological strain. The display screen also provides color correction for color blindness and the like.

Referring to FIG. 14, the sound parameter can cause a sudden effect on the physiological state of the user. For example, the sudden notification with increased sound parameter may cause a change in the physiological state of the user. The human perception over sound depends on loudness and pitch, and the loudness depends on the amplitude of the sound. From human perception, the loudness corresponds to the intensity level. Also, the pitch depends on frequency and from human perception, the pitch defines the shrillness. In a similar manner, the vibration parameter causes a change in the physiological state of the user. Human perception of vibration depends on frequency and amplitude. Frequency is defined as the number of cycles that a vibrating object completes in one second. From human perception, it means time gaps between each sensation. Higher the frequency, lower is the time gap between each sensation. Amplitude is defined as the distance from the stationary position to the extreme position on either side. From human perception, it means loudness of each sensation. Higher the amplitude, higher is the loudness for each sensation.

Figure 15:
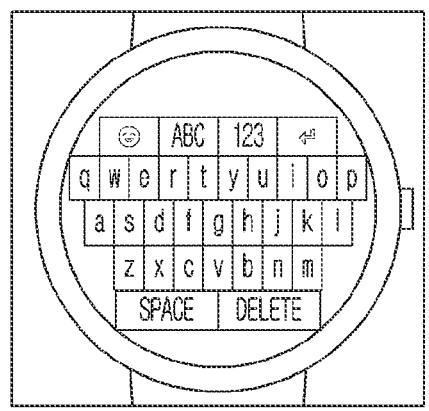
FIG. 15 is an example diagram depicting a layout parameter alerting a physiological state of a user, according to an embodiment of the disclosure.
Figure 15:
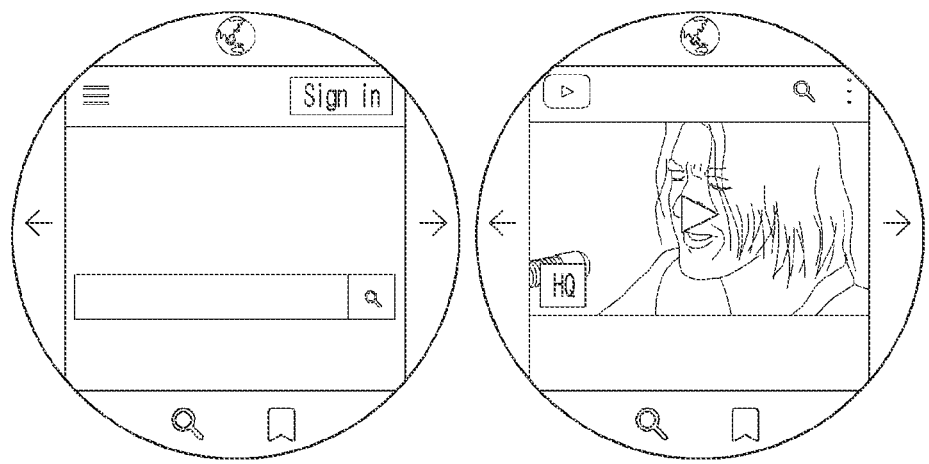

FIG. 15 is an example diagram depicting a layout parameter alerting a physiological state of a user, according to an embodiment of the disclosure.

Referring to FIG. 15, controls which are close to edges are difficult to interact with, resulting in varying levels of annoyance to users of different sensitivity levels.

Referring to FIG. 15, a change in a psychological state may vary for different users during an interaction with a watch screen. For example, typing using the watch keyboard, many users, especially with fat fingers, find it difficult to precisely type certain keys, mostly the rightmost or leftmost keys on the QWERTY watch screen. For example, the letters 'p', 'a', 'l', and the like can cause annoyance and can induce stress. When the user making interactions with a webpage in the smart watch, the users may find it difficult when interacting with user interface controls over webpage, especially because of its inconvenient screen position and inaccuracy to act on it. For example, the control 'more' with three dots at top right edge in the YouTube interface, which can cause annoyance and induce stress. For example, Smart Watch Application interactions, the application has static layouts and controls. Different users find it difficult to interact with few specific screen regions and controls, which can cause annoyance and induce stress.

Figure 16:
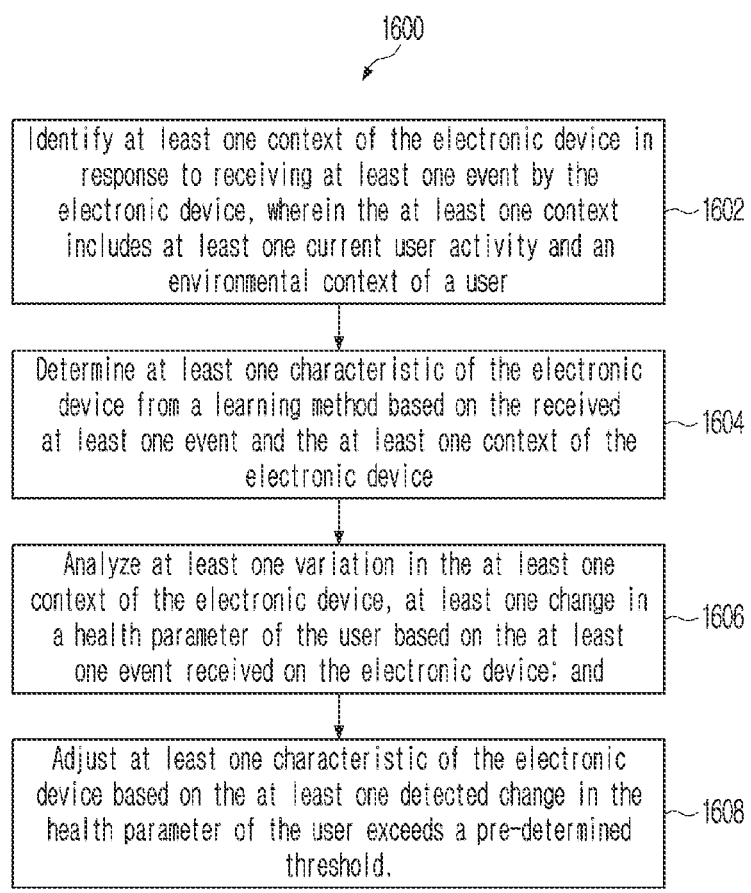
FIG. 16 is a flow diagram illustrating a method for customizing an electronic device in an IoT environment based on a user's physiological state, according to an embodiment of the disclosure.

FIG. 16 is a flow diagram illustrating a method for customizing an electronic device in an IoT environment based on a user's physiological state, according to an embodiment of the disclosure.

At operation 1602, the method includes, identifying, by the electronic device, at least one context of the electronic device in response to the electronic device receiving at least one event, wherein the at least one context includes at least one current user activity and an environmental context of a user.

At operation 1604, the method includes, determining, by the electronic device, at least one characteristic of the electronic device from a learning module based on the received at least one event and the at least one context of the electronic device.

At operation 1606, the method includes, analyzing, by the electronic device, at least one variation in the at least one context of the electronic device, at least one change in a health parameter of the user based on the at least one event received on the electronic device.

At operation 1608, the method includes, adjusting, by the electronic device, at least one characteristic of the electronic device based on the at least one detected change in the health parameter of the user exceeds a pre-determined threshold.

The various actions, acts, blocks, operations, or the like in the method and the flow diagram 1600 may be performed in the order presented, in a different order or simultaneously. Further, in some embodiments, some of the actions, acts, blocks, operations, or the like may be omitted, added, modified, skipped, or the like without departing from the scope of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

FIG. 17 is a flow diagram illustrating a method for customizing an electronic device in an IOT environment as disclosed herein.

At operation 1710, the method includes, identifying context of the electronic device based on an event by the electronic device being receiving, wherein the context includes at least one of a current user activity and an environmental context of a user;

At operation 1720, the method includes, identifying a device characteristic of the electronic device for invoking the received event based on the identified context of the electronic device;

At operation 1730, the method includes, identifying a change in at least one health parameter of the user while invoking the received event based on the device characteristic; and At operation 1740, the method includes, adjusting device characteristic of the electronic device based on the change in at least one health parameter of the user exceeding a pre-determined threshold.

According to embodiments, wherein a pre-defined set of values for the at least one device characteristic is stored in a memory of the electronic device, wherein the pre-defined set of values associated with the received at least one event of the electronic device.

According to embodiments, wherein the at least one current user activity comprises a particular action being performed by the user and the environmental context of the user comprises at least one environmental parameter corresponding to the user while receiving the at least one event.

According to embodiments, wherein the device characteristic of the electronic device is determined by the learning module based on the at least one current user activity and the environmental context of the user while receiving the at least one event on the electronic device.

According to embodiments, wherein the pre-determined threshold depends on at least one user persona of the electronic device.

According to embodiments, wherein the electronic device includes the learning module, wherein the learning module comprises the device characteristic of the electronic device, the change in the at least one health parameter of the user and the adjusted device characteristic of the electronic device.

According to embodiments, wherein the learning module employs a universal learning method based on at least one health parameter of the user, wherein the universal learning method comprises parameters stored in a cloud.

According to embodiments, the control method further comprising: analyzing, by the learning module, the list of at least one change in at least one health parameter of the user and constructing, by the learning module, at least one state-value pair of the corresponding at least one current activity and environmental context of the user.

According to embodiments, wherein the learning module is partially or fully re-used by a different electronic device by the same user.

According to embodiments, wherein the at least one device characteristic comprise at least one of a default characteristic, a user-defined characteristic and a derived characteristic using the learning module.

Embodiments of the disclosure have been described with reference to the accompanying drawings. However, this disclosure is not intended to limit the embodiments described herein but includes various modifications, equivalents, and/or alternatives. In the context of the description of the drawings, like reference numerals may be used for similar components.

In this document, the expressions "have," "may have," "including," or "may include" may be used to denote the presence of a feature (e.g., a component, such as a numerical value, a function, an operation, a part, or the like), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, will be used only in order to distinguish one component from the other components, and do not limit the corresponding components. For example, a first user device and a second user device may indicate different user devices regardless of a sequence or importance thereof. For example, the first component may be named the second component and the second component may also be similarly named the first component, without departing from the scope of the disclosure.

The term such as "module," "unit," "part", and so on may be used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor. The term user may refer to a person using an electronic device or a device using the electronic device (e.g., an artificial intelligence device).

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g., a third element) between the other elements.

Herein, the expression "configured to" can be used interchangeably with, for example, "suitable for," "having the capacity to," "designed to," "adapted to," "made to," or "capable of" The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

Terms used in the disclosure may be used to describe specific embodiments rather than restricting the scope of other embodiments. Singular forms are intended to include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even where they may be defined in the disclosure.

The various example embodiments as described above may be implemented with software including instructions stored in the machine-readable storage media readable by a machine (e.g., a computer). A machine is a device which may call instructions from the storage medium and operate according to the called instructions, and may include an electronic device (e.g.: electronic device 102) of the embodiments. When the instructions are executed by a processor, the processor may perform a function corresponding to the instructions directly or by using other components under the control of the processor. The instructions may include a code generated by a compiler or a code executable by an interpreter.

A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium. For example, "non-transitory storage medium" may refer to a buffer temporarily storing data.

Each of the components (for example, a module or a program) according to the embodiments may be composed of one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations can be added.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

While various example embodiments of the disclosure have been illustrated and described herein, it will be understood that the various example embodiments are intended to be illustrative, not limiting. One of ordinary skill in the art will understand that various changes in form and details may be made without departing from the true spirit and full scope of the disclosure as set forth, for example, in the appended claims and their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A control method for an electronic device, the control method comprising:
    detecting, by the electronic device, a display wake-up event;
    identifying, by the electronic device, a context of the electronic device, wherein the context comprises at least one of a current user activity and an environmental context of the user;
    identifying, by the electronic device, a first layout setting of a touch keyboard UI of the electronic device for displaying the touch keyboard UI based on the identified context of the electronic device and the display wake-up event;
    displaying, by the electronic device, the touch keyboard UI based on the first layout setting;
    detecting, by the electronic device, a touch on the touch keyboard UI;
    identifying, by the electronic device, a change in at least one health parameter of the user while displaying the touch keyboard UI based on the first layout setting of the touch keyboard UI; and
    based on the change in the at least one health parameter of the user exceeding a pre-determined threshold, automatically adjusting, by the electronic device, the first layout setting of the touch keyboard UI of the electronic device to a second layout setting of the touch keyboard UI of the electronic device.

2. The control method of claim 1,
    wherein a pre-defined set of values for the layout setting of the touch keyboard UI is stored in a memory of the electronic device, and
    wherein the pre-defined set of values is associated with the display wake-up event of the electronic device.

3. The control method of claim 1,
    wherein the current user activity comprises a particular action being performed by the user, and
    wherein the environmental context of the user comprises at least one environmental parameter corresponding to the user at a time when the electronic device detects the display wake-up event.

4. The control method of claim 1, wherein the layout setting of the touch keyboard UI of the electronic device is determined by a learning circuitry based on the at least one of the current user activity and the environmental context of the user while detecting the display wake-up event on the electronic device.

5. The control method of claim 1,
    wherein the electronic device comprises a learning circuitry, and
    wherein the learning circuitry comprises a memory for storing the first layout setting of the touch keyboard UI of the electronic device, the change in the at least one health parameter of the user, and the second layout setting of the touch keyboard UI of the electronic device.

6. The control method of claim 5,
    wherein the learning circuitry employs a universal learning method based on at least one health parameter of the user, and
    wherein the universal learning method comprises parameters stored in a cloud.

7. The control method of claim 5, further comprising:
    analyzing, by the learning circuitry, a list comprising the change in the at least one health parameter of the user; and
    constructing, by the learning circuitry, at least one state-value pair corresponding to the at least one of the current user activity and the environmental context of the user.

8. The control method of claim 5, wherein the learning circuitry is partially or fully re-used by a different electronic device by a same user.

9. The control method of claim 1, wherein the layout setting of the touch keyboard UI comprises at least one of a default characteristic, a user-defined characteristic, or a derived characteristic using a learning circuitry.

10. A system for customizing at least one layout setting of a touch keyboard UI of an electronic device, the system comprising:
    a cloud server; and
    a hardware processor,
    wherein the hardware processor is configured to:
        detect a display wake-up event,
        identify a context of the electronic device, wherein the context comprises at least one current user activity and an environmental context of a user,
        identify a first layout setting of a touch keyboard UI of the electronic device for displaying the touch keyboard UI based on the identified context of the electronic device and the display wake-up event,
        display the touch keyboard UI based on the first layout setting,
        detect a touch on the touch keyboard UI,
        identify a change in at least one health parameter of the user while displaying the touch keyboard UI based on the first layout setting of the touch keyboard UI, and
        based on the change in at least one health parameter of the user exceeding a pre-determined threshold, automatically adjust the first layout setting of the touch keyboard UI of the electronic device to a second layout setting of the touch keyboard UI of the electronic device.

11. The system of claim 10,
    wherein a pre-defined set of values for the at least one layout setting of the touch keyboard UI is stored in the electronic device, and
    wherein the pre-defined set of values is associated with the display wake-up event of the electronic device.

12. The system of claim 10,
    wherein the at least one current user activity comprises a particular action being performed by the user, and
    wherein the environmental context of the user comprises at least one environmental parameter corresponding to the user at a time when the electronic device receives the display wake-up event.

13. The system of claim 10, wherein the layout setting of the touch keyboard UI of the electronic device is determined by a learning circuitry based on the at least one of the current user activity and the environmental context of the user while detecting the display wake-up event on the electronic device.

14. The system of claim 10, wherein the electronic device comprises a learning circuitry, where the learning circuitry comprises a memory for storing the first layout setting of the touch keyboard UI of the electronic device, the change in the at least one health parameter of the user, and the second layout setting of the touch keyboard UI of the electronic device.

15. The system of claim 14, wherein the learning circuitry employs a universal learning method based on the at least one health parameter of the user, and wherein the universal learning method comprises parameters stored in a cloud.

16. The system of claim 14, wherein the hardware processor is further configured to:

analyze, by the learning circuitry, a list comprising the change in the at least one health parameter of the user of the electronic device, and construct, by the learning circuitry, at least one state-value pair corresponding to the at least one of the current user activity and the environmental context of the user.

17. The system of claim 14, wherein the learning circuitry is partially or fully re-used by a different electronic device by a same user.

18. The system of claim 10, wherein the at least one layout setting of the touch keyboard UI comprises at least one of a default characteristic, a user-defined characteristic, or a derived characteristic using a learning circuitry.

* * * * *